United States Patent
Sachs et al.

(10) Patent No.: US 10,064,225 B2
(45) Date of Patent: Aug. 28, 2018

(54) METHOD AND DEVICE FOR D2D CONFIGURATION

(71) Applicant: Telefonaktiebolaget L M Ericsson (publ), Stockholm (SE)

(72) Inventors: Joachim Sachs, Sollentuna (SE); Mikael Prytz, Rönninge (SE); Yngve Selén, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 372 days.

(21) Appl. No.: 14/433,090

(22) PCT Filed: Oct. 2, 2012

(86) PCT No.: PCT/SE2012/051052
§ 371 (c)(1),
(2) Date: Apr. 2, 2015

(87) PCT Pub. No.: WO2014/054986
PCT Pub. Date: Apr. 10, 2014

(65) Prior Publication Data
US 2015/0245397 A1    Aug. 27, 2015

(51) Int. Cl.
*H04W 76/14*    (2018.01)
*H04W 76/02*    (2009.01)
(Continued)

(52) U.S. Cl.
CPC ......... *H04W 76/023* (2013.01); *H04L 1/0015* (2013.01); *H04W 8/005* (2013.01);
(Continued)

(58) Field of Classification Search
CPC .. H04L 1/0003; H04L 1/0015; H04W 64/006; H04W 76/023; H04W 88/06; H04W 8/005; H04W 76/02; H04B 7/00
See application file for complete search history.

(56) References Cited

U.S. PATENT DOCUMENTS

2006/0135150 A1* 6/2006 Oh .................. H04W 36/32
                                                455/425
2009/0131067 A1* 5/2009 Aaron .............. H04W 72/082
                                                455/452.2
(Continued)

FOREIGN PATENT DOCUMENTS

WO    2004077918 A2    9/2004
WO    2012049351 A1    4/2012

*Primary Examiner* — Frantz Bataille
(74) *Attorney, Agent, or Firm* — Murphy, Bilak & Homiller, PLLC

(57) ABSTRACT

A method in a D2D controller for sending a configuration message to use a communication mode to a first device, wherein the first device is configured to enable communication with a second device through a network-controlled D2D communication mode, wherein the D2D controller, the first device and the second device are comprised in a wireless network, and wherein the method comprises: obtaining (201) a first speed of the first device with respect to the D2D controller, and, when the first speed exceeds a first threshold, sending (207) a first configuration message to the first device to use a first communication mode, wherein the first communication mode is one of the following communication modes: a cellular communication mode, and a device-controlled D2D mode. A method in the first device for configuring the first device to use a communication mode, according to a message received from the D2D controller.

43 Claims, 7 Drawing Sheets

(51) Int. Cl.
*H04W 64/00* (2009.01)
*H04W 8/00* (2009.01)
*H04W 72/04* (2009.01)
*H04W 88/06* (2009.01)
*H04L 1/00* (2006.01)

(52) U.S. Cl.
CPC ....... *H04W 64/006* (2013.01); *H04W 72/048* (2013.01); *H04W 76/14* (2018.02); *H04L 1/0003* (2013.01); *H04W 88/06* (2013.01)

(56) References Cited

U.S. PATENT DOCUMENTS

2010/0094532 A1* 4/2010 Vorona ................ G08G 1/0104
701/119
2010/0169498 A1 7/2010 Palanki et al.

* cited by examiner

METHOD AND DEVICE FOR D2D CONFIGURATION

TECHNICAL FIELD

Embodiments herein relate to a network node and a method therein, and to a first device and a method therein. In particular, embodiments herein relate to handling Device-to-Device (D2D) communication.

BACKGROUND

Communication devices such as User Equipments (UE) are also known as e.g. mobile terminals, wireless terminals and/or mobile stations. User equipments are enabled to communicate wirelessly in a wireless network, sometimes also referred to as a cellular radio system or cellular network. The communication may be performed e.g., between two user equipments, between a user equipment and a regular telephone and/or between a user equipment and a server. The communication may be performed e.g., via a Radio Access Network (RAN) and possibly one or more core networks, comprised within the wireless network.

User equipments may further be referred to as mobile telephones, cellular telephones, or laptops with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as user equipment or a server.

The wireless network covers a geographical area which is divided into cell areas, wherein each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, the expression Downlink (DL) is used for the transmission path from the base station to the mobile station. The expression Uplink (UL) is used for the transmission path in the opposite direction i.e. from the mobile station to the base station.

In network-controlled Device-to-Device (D2D) communications, a network such as a radio access network assists user equipments that are in the proximity of each other to discover one another, in a process referred to as device discovery, and establish a direct link referred to as D2D bearer establishment, rather than a link via the base station. In fact, when two user equipments communicate with each other via a cellular base station, the communication path involves an uplink and a downlink, both with associated resources, as opposed to the single hop direct D2D link.

Network-controlled D2D communication refers to two distinct cases in terms of the number of base stations or wireless access points, such as eNB, that are involved. In a single eNB case, both user equipments are connected or camp on, i.e. are served by the same eNB. In a multiple eNB case, the two devices that are candidates for direct D2D communications are served by different eNBs.

In network-controlled device discovery the radio access network may, for example, allocate resources for beacon signals, so that transmitting and receiving user equipments know what time and frequency resources being used for device discovery, that is when and at what frequencies beacons should be transmitted and scanned for or received. Alternatively, a user equipment may register at the network for D2D communications. Subsequently, another user equipment may inquire the network for possible peers allowing the network to mediate between, basically to match, the user equipments in finding each other.

The initiation of the establishment of the D2D link may be made by the radio access network or by any of the user equipments of the D2D pair. In network initiated D2D link establishment, the network realizes that two communicating user equipments are in the proximity of each other. In user equipment initiated D2D link establishment, the user equipments discover the proximity of each other and also some of their capabilities which is necessary for them to establish a D2D link, similar to Bluetooth.

In network-controlled D2D communication, a network control function performs at least one of: a) provisioning of a discovery signal to be used between two devices to determine their proximity and/or D2D link estimation, b) resource assignment for the D2D discovery signal and/or a D2D data channel and/or a D2D control channel, c) relaying of information between the at least two devices, and d) configuration of connection parameters for the at least two devices of the D2D link, such as power setting, e.g., actual, min, max, coding and modulation schemes, segmentation configuration, e.g., transport block sizes, parameters and/or security keys for encryption/integrity protection and protocol parameters.

The actual D2D transmission may then be either in the same spectrum as the network-device links or in separate spectrum, and may use another radio technology.

The actual D2D transmission does not need to be in licensed spectrum. In network controlled D2D only parts of the D2D link configuration, proximity detection need to be via licensed spectrum.

A D2D link may be initiated or maintained while the user equipments of the D2D pair are moving. However, if at least one of the user equipments of the D2D pair moves too quickly, two problems may arise: a) the D2D communication link may not be stable for a long time, which means that the D2D communication is likely to fail after short times; and/or b) the user equipments remain only temporarily connected to the network node controlling the communication, which means that the management and configuration of the D2D communication may likely fail after a short time.

SUMMARY

It is therefore an object of embodiments herein to provide a way of improving the handling of D2D communications in a wireless network.

According to a first aspect of embodiments herein, the object is achieved by a method in a D2D controller for sending a configuration message to use a communication mode to a first device, wherein the first device is configured to enable communication with a second device through a network-controlled D2D communication mode, wherein the D2D controller, the first device and the second device are comprised in a wireless network, and wherein the method comprises: obtaining a first speed of the first device with respect to the D2D controller, and, when the first speed of the first device exceeds a first threshold, sending a first configuration message to the first device to use a first communication mode, wherein the first communication mode is one of the following communication modes: a cellular communication mode, and a device-controlled D2D mode.

According to a second aspect of embodiments herein, the object is achieved by a method in a first device for configuring the first device to use a communication mode, wherein the first device is configured to enable communication with a second device through a network-controlled D2D communication mode, wherein the first device, the second device and a D2D controller are comprised in a wireless network, and wherein the method comprises: when a first speed of the first device with respect to the D2D controller exceeds a first threshold, receiving a first configuration message from the D2D controller, to configure the first device to use a first communication mode, wherein the first communication mode is one of the following communication modes: a cellular communication mode, and a device-controlled D2D mode; and configuring the first device to use the first communication mode based on the received first message.

According to a third aspect of embodiments herein, the object is achieved by a D2D controller for sending a configuration message to use a communication mode to a first device, wherein the first device is configured to enable communication with a second device through a network-controlled D2D communication mode, wherein the D2D controller, the first device and the second device are arranged to be comprised in a wireless network, the D2D controller comprising: a processing circuit configured to: a) obtain a first speed of the first device with respect to the D2D controller, and b) send a first configuration message to the first device to use a first communication mode when the first speed of the first device exceeds a first threshold, wherein the first communication mode is one of the following communication modes: a cellular communication mode, and a device-controlled D2D mode.

According to a fourth aspect of embodiments herein, the object is achieved by a first device for configuring the first device to use a communication mode, wherein the first device is configured to enable communication with a second device through a network-controlled D2D communication mode, wherein the first device, the second device and a D2D controller are arranged to be comprised in a wireless network, and wherein the first device comprises: a processing circuit configured to: a) receive a first configuration message from the D2D controller, to configure the first device to use a first communication mode when a first speed of the first device with respect to the D2D controller exceeds a first threshold, wherein the first communication mode is one of the following communication modes: a cellular communication mode, and a device-controlled D2D mode; and b) configure the first device to use the first communication mode based on the received first message.

An advantage of embodiments herein is that network nodes and/or user equipments may establish or continue to have a D2D communication, even when at least one of the devices is moving at a high speed, without any of the users involved in the communication experiencing a communication failure.

A further advantage according to embodiments herein is a wireless network with enhanced efficiency and enhanced capacity, as communication failures are reduced and the communication opportunities are maximized.

A yet further advantage according to embodiments herein is that the radio resources of the network are better utilized by choosing the more adequate communication mode between the devices, depending on the speed of the user equipments engaged in a D2D communication.

BRIEF DESCRIPTION OF THE DRAWINGS

Examples of embodiments herein are described in more detail with reference to attached drawings in which.

DETAILED DESCRIPTION

Figure 1:
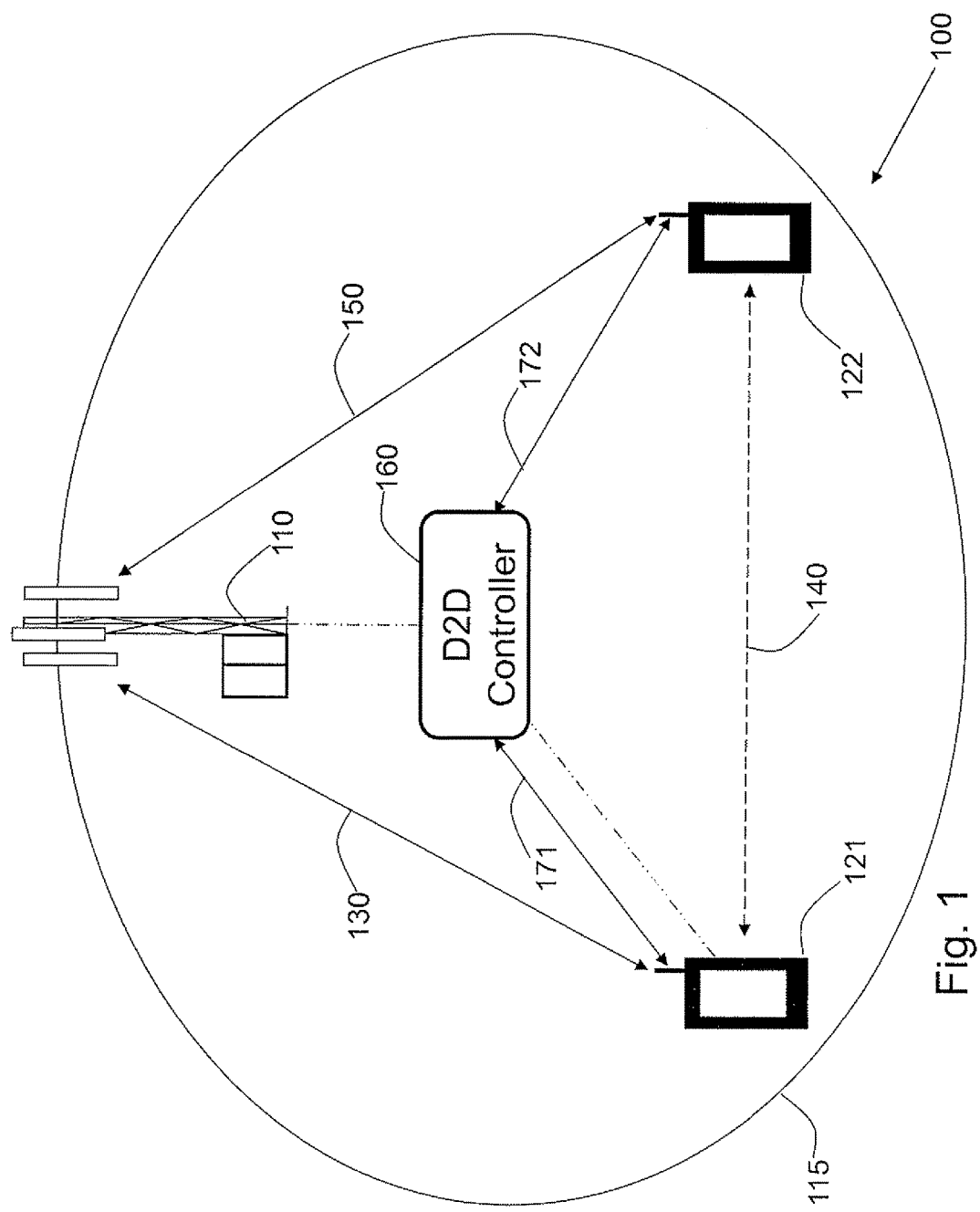
FIG. 1 is a schematic block diagram illustrating embodiments in a wireless communications system.

FIG. 1 depicts a wireless network 100 in which embodiments herein may be implemented. The wireless network 100 is a wireless communication network such as an LTE, WCDMA, GSM network, any 3GPP cellular network, any 3GPP2 cellular network, a WiMAX network, a WiFi network, or any wireless network or system.

The wireless network 100 comprises a network node 110. The network node 110 may be a base station such as e.g. an eNB, eNodeB, or a Home Node B, a Home eNode B, femto Base Station (BS), pico BS or any other network unit capable to serve a user equipment or a machine type communication device in a wireless network 100. In some particular embodiments, network node 110 may be a stationary relay node, a mobile relay node, or a user equipment. In the example depicted in FIG. 1, wherein the network node 110 is a base station, the network node 110 serves a cell 115. Typically, wireless network 100 may comprise more cells similar to 115, served by their respective network nodes. This is not depicted in FIG. 1 for the sake of simplicity.

A first device 121 and a second device 122 are located within the cell 115. The first device 121 is configured to communicate within the wireless network 100 via the network node 110 over a radio link 130 when the first device 121 is present in the cell 115 served by the network node 110. The first device 121 is capable of communicating with other devices such as the second device 122 to be described below, or other devices using wireless D2D communication over, for example, a D2D link 140.

In this example, the second device 122 is also located within the cell 115. However, in other embodiments, the second device 122 may be located in another cell which is in the neighbourhood of the cell 115, but within radio range of the first device 121. The second device 122 is configured to communicate within the wireless network 100 via the network node 110 or another network node serving the neighbouring cell, over a radio link such as e.g. a radio link 150 when the second device 122 is present in the cell 115 served by the network node 110 or in the adjacent cell served by the other network node. The second device 122 is capable of communicating with other devices such as the first device 121, or other devices using wireless D2D communication over, for example, the D2D link 140.

The second device 122 may also be referred to as a network node.

The first device 121 and the second device 122 may e.g. be user equipments, mobile terminals or wireless terminals, mobile phones, computers such as e.g. a laptop, Personal Digital Assistant (PDA) or tablet computers, sometimes referred to as surf plates with wireless capability, Machine-to-Machine (M2M) devices, devices equipped with a wireless interface, such as a printer or a file storage device or any other radio network unit capable of communicating over a D2D link and over a radio link in a cellular communications system.

The wireless network 100 also comprises a D2D controller 160. The D2D controller 160 manages the D2D communications of devices such as the first device 121 and the second device 122. It determines if and which devices have the possibility to communicate in a direct D2D communication. The D2D controller 160 may provision a discovery signal to be used between two devices to determine their proximity and/or D2D link estimation. It may also assign resources for the D2D discovery signal and/or a D2D data channel and/or a D2D control channel. It may relay information between the at least two devices, and it may configure connection parameters for the at least two devices of the D2D link, such as power setting, e.g., actual, min, max, coding and modulation schemes, segmentation configuration, e.g., transport block sizes, parameters and/or security keys for encryption/integrity protection, protocol parameters, which Radio Access Technology, spectrum/carrier to use for D2D link. Typically, the D2D controller 160 may be co-located with a network node. The network node co-located with the D2D controller 160 may be in some embodiments: a base station, a stationary relay node—not pictured—, a mobile relay node—not pictured—, the first device 121, the second device 122, or a wireless device other than the first device 121 and the second device 122. The co-location is represented in FIG. 1 with dashed-dotted lines. The D2D controller 160 is capable of communicating with devices such as the first device 121 and the second device 122 over a D2D controller link 171 and a D2D controller link 172, respectively. The D2D controller 160 may also communicate with other devices over other D2D controller links.

Embodiments of a method in the D2D controller 160 for sending a configuration message to use a communication mode to a first device 121 will now be described with reference to the flowcharts depicted in FIG. 2 and FIG. 3. As mentioned above, the first device 121 is configured to enable communication with the second device 122 through a network-controlled D2D communication mode and the D2D controller 160, the first device 121 and the second device 122 are comprised in the wireless network 100.

The method comprises the following actions, which actions may as well be carried out in another suitable order than described below. In some embodiments, all the actions may be carried out, whereas in other embodiments only some action/s may be carried out.

Action 201

Since speeds of the devices with respect to the D2D controller 160, as well as with respect to each other may affect the stability of the D2D communication between the devices, the D2D controller 160 needs to be informed about such factors, which in some embodiments may also include a future proximity of the devices with respect to one another, as will be described later, under action 205.

Therefore, in this action, the D2D controller 160 obtains a first speed of the first device 121 with respect to the D2D controller 160.

In some embodiments, the first speed of the first device 121 may be one or more values of the speed as measured by one or more different methods such as an absolute device velocity, a Doppler shift, signal variations over time for pilot signals, handover events, or a positioning method such as GPS, GLONASS, Galileo and other positioning systems known to those of skill in the art.

In some particular embodiments, such as when the D2D controller 160 is a stationary D2D controller, or when the D2D controller 160 is co-located with the first device 121, the first speed may be an absolute device velocity of the first device 121 with respect to the D2D controller 160. In other embodiments, the first speed may be the result of a comparison of speeds, or a comparison of speeds and thresholds. For example, the first speed of the first device 121 with respect to the D2D controller may be the result of comparing the speed of the first device 121 with the speed of the D2D controller 160 in the embodiments in which the D2D controller is not a static controller. In some particular embodiments, the speed of the first device 121 with respect to the D2D controller 160 may be the result of comparing the speed of the first device 121 with the speed of the D2D controller 160, and with a first threshold. The first threshold will be described in further detail under action 202.

Obtaining may comprise measuring or receiving the first speed of the first device 121, as explained below.

In some embodiments, the first speed may be measured by a structure in the wireless network 100, such as a base station, the first device 121, the second device 122, a wireless device other than the first device 121 and the second device 122, and a network node other than the D2D controller 160. In such embodiments, the D2D controller 160 may then receive the first speed of the first device 121, as measured by the other network node via a communication protocol, such as those defined for location based services.

In some other embodiments, the D2D controller 160 itself may measure the first speed of the first device 121, by for example, receiving regular position information of the first device 121, and deriving the speed.

Action 202

In the embodiments in which the D2D controller 160 does not obtain a first speed which has already been compared with a first threshold, the D2D controller 160 may need to establish whether the first threshold has been exceeded. The first threshold may set the speed above which a network-controlled D2D communication link maintained by the first device 121 may become unstable, and which may trigger the D2D controller 160 to take further action to prevent a D2D communication failure.

Therefore, in some embodiments, the D2D controller 160 may establish that the first speed of the first device 121 exceeds the first threshold, as described above. This is performed by comparing the obtained first speed of the first device 121 with the first threshold.

Action 203

In some embodiments, the first speed of the first device 121 is too high with respect to the D2D controller 160 to maintain a stable network-controlled D2D communication under the management of the D2D controller 160, i.e., it is above the first threshold. In these embodiments, the D2D controller 160 may make a determination on whether a D2D communication mode between the first device 121 and the second device 122 would still be possible by using a device-controlled D2D communication mode. In these embodiments, the speed of the first device 121 with respect to the second device 122 may be taken into consideration. An example of such embodiments is when the first device 121 and the second device 122 move at the same speed, and in the same direction, such that they remain within proximity, e.g. if they are both moving in the same vehicle, such as a car or a bus.

Therefore, in some embodiments, the D2D controller 160 may obtain a second speed of the first device 121 with respect to the second device 122.

Similarly to the first speed of the first device 121, in some embodiments, the second speed of the first device 121 may be one or more values of the speed as measured by one or more different methods such as an absolute device velocity, Doppler shift, signal variations over time for pilot signals, handover events, or a positioning method such as GPS, GLONASS, Galileo and other positioning systems known to those of skill in the art.

In some particular embodiments, such as when the second device 122 is stationary, the second speed may be the absolute device velocity of the first device 121 with respect to the second device 122. In other embodiments, the second speed may be the result of a comparison of speeds, or a comparison of speeds and thresholds. For example, the second speed of the first device 121 with respect to the second device 122 may be the result of comparing the speed of the first device 121 with the speed of the second device 122 in the embodiments in which the second device 122 is not a static device. In some particular embodiments, the second speed of the first device 121 with respect to the second device 122 may be the result of comparing the speed of the first device 121 with the speed of the second device 122, and with another threshold such as a second threshold.

In some embodiments, the second threshold may set the speed below which a D2D communication link established between the first device 121 and the second device 122 may be maintained because they are, at least approximately, not moving with respect to one another, i.e., moving approximately or exactly at the same speed, and which may trigger the D2D controller 160 to take further action to prevent a D2D communication failure, as described further below.

Similarly to what was explained in reference to action 201, obtaining may comprise measuring or receiving the second speed of the first device 121.

In some embodiments, the second speed may be measured by a network node in the wireless network 100, such as a base station, the first device 121, the second device 122, a wireless device other than the first device 121 and the second device 122, and a network node other than the D2D controller 160. In such embodiments, the D2D controller 160 may then receive the second speed of the first device 121, as measured by the other network node, in a similar manner as it was described for the first speed of the first device 121.

In some other embodiments, the D2D controller 160 itself may measure the second speed of the first device 121, in a similar manner as it was described for the first speed of the first device 121.

Action 204

As described above, the second threshold may set the speed below which a D2D communication link established between the first device 121 and the second device 122 may be maintained because they are, at least approximately, not moving with respect to one another, i.e., moving approximately or exactly at the same speed, and which may trigger the D2D controller 160 to take further action to prevent a D2D communication failure. In the embodiments in which the D2D controller 160 does not obtain a second speed which has already been compared with a threshold such as the second threshold, the D2D controller 160 may need to establish whether the second threshold has not been exceeded.

Therefore, in some embodiments, the D2D controller 160 may establish that the second speed of the first device 121 does not exceed a second threshold, as described above. This is performed by comparing the obtained second speed of the first device 121 with the second threshold.

Action 205

In some embodiments in which the first device 121 and the second device 122 move at the same or approximately the same speed, a D2D communication may still not be possible between the devices if they are too far from one another. Therefore, in some embodiments, the D2D controller 160 may need to ascertain if the first device 121 and the second device 122 are in sufficient close proximity to allow for a D2D communication. In some embodiments, proximity may be estimated by taking into account a number of factors such as: the respective positions of the first device 121 and second device 122, i.e., the distance between one another, their speed/s, if they are moving, and the direction in which they are moving. For example, in some embodiments, the devices may be moving together in a cluster, at the same speed and within a short distance to one another, such as when moving together in the same vehicle. In other embodiments, the devices may be moving towards one another in close range. In both of these embodiments, a D2D communication may be feasible if the devices are within a close distance to one another. In some embodiments, proximity may be estimated by taking into account a correlation between handover events of the first device 121 and second device 122, which would indicate that the devices are moving in the same direction. In other embodiments, more complex proximity estimations may be used, such as historic position information for the devices (e.g., on Monday afternoon the devices tend to take a certain track), or second order effects, such as the change in velocity/direction over a last time period. These are only some examples of how proximity may be estimated, but other methods may be used in other embodiments, as will be apparent to one of skill in the art. Since the devices may be moving, the proximity may therefore be a dynamic variable that changes over time. Thus, in some embodiments, the proximity may be a future proximity. Future may determine the point in time or time period, in which the estimated proximity may be valid.

In such embodiments, the D2D controller 160 may obtain a first estimation of future proximity of the first device 121 with respect to the second device 122, for example, based on position, speed and direction information received by the devices, such as the first device 121 and the second device 122, or based on handover events that are correlated among the devices, e.g., in the same direction. Other methods of obtaining the first estimation are possible, as described above.

In some embodiments, the first estimation of future proximity of the first device 121 may be one or more values of the estimated future proximity of the first device 121, as measured by the methods just described or by other methods known to those of skill in the art.

In other embodiments, the first estimation of future proximity of the first device 121 may be the result of a comparison of a first estimation of future proximity and a threshold. For example, the first estimation of future proximity of the first device 121 with respect to the second device 122 may be the result of comparing the position, speed and direction of movement of the first device 121 with the position, speed and direction of movement of the second device 122 in the embodiments in which the second device 122 is not a static device. In some particular embodiments, the first estimation of future proximity of the first device 121 with respect to the second device 122 may be the result of comparing the position, speed and direction of movement of the first device 121 with the position, speed and direction of movement of the second device 122, and with a threshold, such as a future proximity threshold. For example, devices 121 and 122 may be considered to be close enough to one another to allow for D2D communication if their estimated future proximity is below a certain future proximity threshold.

In some embodiments, the future proximity threshold may set the value below which a D2D communication link maintained by the first device 121 and the second device 122 may be considered feasible because they are close enough to one another, and which may trigger the D2D controller 160 to take further action to prevent a D2D communication failure, as described further below. In some particular embodiments the direction of movement of the first device 121 may be different to that of the second device 122, but a communication link between the first device 121 and the second device 122 may still be feasible because the devices are moving towards each other.

As explained in reference to action 201, obtaining may comprise measuring or receiving the first estimation of future proximity of the first device 121, as explained below.

In some embodiments, the first estimation of future proximity of the first device 121 may be measured by a network node in the wireless network 100, such as a base station, the first device 121, the second device 122, a wireless device other than the first device 121 and the second device 122, and a network node other than the D2D controller 160. In such embodiments, the D2D controller 160 may then receive the first estimation of future proximity of the first device 121, as measured by the other network node.

In some embodiments, the D2D controller 160 itself may measure the first estimation of future proximity of the first device 121, as described above.

Action 206

In the embodiments in which the D2D controller 160 does not obtain a first estimation of future proximity which has already been compared with a threshold, such as the future proximity threshold, the D2D controller 160 may need to establish whether the future proximity threshold has not been exceeded. Therefore in these embodiments, the D2D controller 160 may establish that the first estimation of future proximity of the first device 121 with respect to the second device 122 does not exceed a future proximity threshold, as described above. This is performed by comparing the obtained first estimation of future proximity of the first device 121 with respect to the second device 122 with the future proximity threshold.

Action 207

As described earlier, the D2D controller 160 manages the D2D communication link 140 between the first device 121 and the second device 122. If the first device 121 has a first speed with respect to the D2D controller 160 that is above the first threshold, network-controlled D2D communication between the first device 121 and the second device 122 may not be stable for a long time, which means that the D2D communication or the control of the D2D communication is likely to fail after a short time. Moreover, in the embodiments in which the D2D controller 160 is co-located with a network node other than the first device 121, if the first device 121 has a first speed with respect to the D2D controller 160 that is above the first threshold, the first device 121 may remain only temporarily connected to the D2D controller 160, which means that the management and configuration of the D2D communication may likely fail after a short time. This means that when the first speed exceeds the first threshold, the D2D controller needs to perform an action to avoid a D2D communication failure between the first device 121 and the second device 122. In some embodiments, this action is to send a first configuration message to the first device 121 to use a communication mode, i.e., a first communication mode, which is different from the communication mode that the first device 121 is configured to use. This first communication mode is one of a cellular communication mode and a device-controlled D2D mode.

Therefore, in this action, when the first speed of the first device 121 exceeds the first threshold as described above, the D2D controller 160 sends a first configuration message to the first device 121 to use a first communication mode. The first communication mode is one of the following communication modes: a cellular communication mode and a device-controlled D2D mode. The first configuration message may comprise configuration parameters for the first communication mode, such as power setting, e.g., actual, min, max, coding and modulation schemes, segmentation configuration, e.g., transport block sizes, parameters and/or security keys for encryption/integrity protection, protocol parameters, which Radio Access Technology, spectrum/carrier to use for D2D link. In some embodiments, the configuration message may be, e.g., a Radio Resource Control protocol message.

In some embodiments in which the first speed of the first device 121 exceeds the first threshold, the D2D controller 160 may determine that the communication mode should be set to a cellular communication mode, as the network controlled-D2D communication mode may become unstable. In these embodiments, the D2D controller 160 will send a first configuration message to the first device 121 to use a first communication mode which is a cellular communication mode.

In other embodiments in which the first speed of the first device 121 exceeds the first threshold, a D2D communication may still continue to be stable if for example, the first device and the second device are moving together jointly in a cluster while they are maintaining a D2D communication i.e., they move remaining close enough to one another. An example of such embodiments is when the first device 121 and the second device 122 are both moving in the same vehicle, such as a car or a bus.

In these embodiments, the D2D controller 160 may have obtained a second speed of the first device with respect to the second device 122 which is the result of a comparison of the speed of the first device 121 with respect to the speed of the second device 122, with respect to a threshold such as the second threshold, or may have first established that the second speed of the first device 121 does not exceed the second threshold, i.e., it moves at the same or approximately the same speed as the second device 122.

In these embodiments, the D2D controller 160 may also have obtained a first estimation of future proximity of the first device with respect to the second device 122 which is the result of a comparison of the first estimation of future proximity of the first device 121 with respect to the second device 122, with respect to a threshold such as the future proximity threshold, or may have first established that the first estimation of future proximity of the first device 121 with respect to the second device 122 has not exceeded the future proximity threshold.

In these embodiments, the D2D controller 160 may determine that the communication mode between the first and second devices should be set to a device-controlled D2D mode, as the network controlled-D2D communication mode may become unstable, but the device-controlled D2D communication may be stable. In these embodiments, the D2D controller 160 may send a first configuration message to the first device 121 wherein the first communication mode in the first configuration message sent to the first device 121 is a device-controlled D2D mode.

As mentioned above, in some of these embodiments, a configuration in the first configuration message may be based on the first speed of the first device 121. In some other of these embodiments, the configuration in the first configuration message may be based on the second speed of the first device 121. In some other of these embodiments, the configuration in the first configuration message may be further based on the first estimation of future proximity of the first device 121 with respect to the second device 122. In yet other of these embodiments, the configuration in the first configuration message may be based on all of these factors.

The first message as described in the embodiments above may be: e.g., a recommendation for a configuration command, or a configuration command. In the embodiments in which the D2D controller 160 decides which communication mode the first device 121 should use, the first configuration message may be a configuration command. A configuration command may make it mandatory for the first device 121 and the second device 122 to change configuration. In the embodiments in which the first device 121 decides which communication mode the first device 121 should use, the first configuration message may be a recommendation for a configuration command. A configuration recommendation message may indicate a preferred configuration to the first device 121, and the first device 121 may determine whether to follow the recommendation or not. Recommendation may also be the provisioning of measures, such as speed, and thresholds, from which the first device 121 determines which communication mode to use.

A cellular communication mode is one where the communication between the first device 121 and the second device 122 is not conducted directly from device to device over the D2D link 140, i.e., in a D2D fashion, but it is conducted through the network node 110 over the radio links 130 and or/150 or through another similar network node and radio links.

A device-controlled D2D mode is one where the communication between the first device 121 and the second device 122 is conducted directly from device to device over the D2D link 140, i.e., in a D2D fashion, and not through the network node 110 over the radio links 130 and or/150 or through another similar network node and radio links, and it means that the D2D communication is managed directly by the first device 121 and/or the second device 122.

Action 208

In some embodiments, a communication may be active between the first device 121 and the second device 122. In these embodiments, once the D2D controller 160 has sent a first configuration message to the first device 121 to use a first communication mode, it may be necessary to send another message to the second device 122 to also use the same first communication mode, so that the ongoing communication between the devices may continue. In some embodiments, the first device 121 may send this message. In other embodiments, the D2D controller 160 may send this message.

In this action, the D2D controller 160 may send a second configuration message to the second device 122 to use the first communication mode, in a similar manner as it sent the first message to the first device 121. The second configuration message may have similar characteristics to the first communication message, and not all will be repeated here. For example, the second configuration message may comprise configuration parameters for the first communication mode, as described above for the first communication message.

As mentioned above for the first configuration message, in some of these embodiments, a configuration in the second configuration message may be based on the first speed of the first device 121. In some other of these embodiments, the configuration in the second configuration message may be based on the second speed of the first device 121. In some other of these embodiments, the configuration in the second configuration message may be further based on the first estimation of future proximity of the first device 121 with respect to the second device 122. In yet other of these embodiments, the configuration in the second configuration message may be based on all of these factors.

The method may either end, or go back to action 201 and be repeated totally or partially, as just described. Otherwise, it may continue to the method described in FIG. 3.

Action 301

A network-controlled D2D communication is more advantageous because it represents less overhead for the management and control of the D2D link, more efficient communication via the D2D link, and less battery consumption by the devices maintaining the D2D. Therefore, in some embodiments in which the first device 121 has exceeded the first speed threshold, the D2D controller 160 may proceed with further actions if the speed of the first device 121 slows down enough to be able to re-establish a network-controlled D2D communication. This may be determined by comparing the speed of the first device 121 with a third threshold. In some embodiments, the third threshold may be the same as the first threshold. In other embodiments, the third threshold may be the first threshold plus or minus an offset value. The offset value may be added or subtracted from the first threshold in order to avoid a ping-pong change of communication modes in speeds that vary over time close to the first threshold. In such embodiments in which the first communication mode is a device-controlled D2D mode or a cellular communication mode, the D2D controller 160 may determine that a network-controlled D2D communication would be possible and may therefore send a third configuration message to use a second communication mode to a first device 121, as will now be described.

In some embodiments, in order to ascertain whether a network-controlled D2D communication is possible, the D2D controller 160 may need to obtain a third speed of the first device 121 with respect to the D2D controller 160.

The third speed of the first device 121 may be defined in a similar manner as done earlier for the first speed of the first device 121. One difference between the first speed of the first device 121 and the third speed of the first device 121 is that they are taken at two different moments in time. In some embodiments in which the first speed is the result of a comparison of speeds and thresholds, another difference between the first speed of the first device 121 and the third speed of the first device 121 is that the threshold used for the comparison may be the third threshold, as defined above.

As stated earlier for action 201, obtaining may comprise measuring or receiving the third speed of the first device 121, as explained below.

In some embodiments, the third speed may be measured by a structure in the wireless network 100, such as a base station, the first device 121, the second device 122, a wireless device other than the first device 121 and the second device 122, and a network node other than the D2D controller 160. In such embodiments, the D2D controller 160 may then receive the third speed of the first device 121, as measured by the other network node. The third speed of the first device 121 may be received by the D2D controller 160 similarly to how it was described above for the first speed.

In some embodiments, the D2D controller 160 itself may measure the third speed of the first device 121. The third speed of the first device 121 may be measured by the D2D controller 160 similarly to how it was described above for the first speed of the first device 121.

Action 302

In the embodiments described above, in which the D2D controller 160 does not obtain a third speed which has already been compared with the third threshold, the D2D controller 160 may need to establish whether the third threshold has not been exceeded. That is, the D2D controller may need to establish if the first device 121 has slowed down below the third threshold, so that a network-controlled D2D communication between the first device 121 and the second device 122 would be stable, which means that the D2D communication would not be likely to fail after a short time.

Therefore, in such embodiments, the D2D controller 160 may establish that the third speed of the first device 121 does not exceed the third threshold as described above. This is performed by comparing the obtained third speed of the first device 121 with respect to the D2D controller 160 with the third threshold.

Action 303

In some embodiments, a communication may be active between the first device 121 and the second device 122. In these embodiments, if, in addition, the third speed of the first device 121 has been found not to exceed the third threshold, in order to ascertain whether a network-controlled D2D communication is possible, the D2D controller 160 may also need to know if the speed of the second device 122 is also below the third threshold. If a communication between the devices is active, both devices may need to move at a speed below the third threshold in order to maintain a network-controlled D2D communication. Thus, in this action, the D2D controller may obtain a first speed of the second device 122 with respect to the D2D controller 160.

The first speed of the second device 122 may be defined in a similar manner as done earlier for the third speed of the first device 121.

As stated earlier for action 201, obtaining may comprise measuring or receiving the first speed of the second device 122, as explained below.

In some embodiments, the first speed of the second device 122 may be measured by a structure in the wireless network 100, such as a base station, the first device 121, the second device 122, a wireless device other than the first device 121 and the second device 122, and a network node other than the D2D controller 160. In such embodiments, the D2D controller 160 may then receive the first speed of the second device 122, as measured by the other network node. The first speed of the second device 122 may be received by the D2D controller 160 similarly to how it was described above for the first speed of the first device 121.

In some embodiments, the D2D controller 160 itself may measure the first speed of the second device 122. The first speed of the second device 122 may be measured by the D2D controller 160 similarly to how it was described above for the third speed of the first device 121.

Action 304

In the embodiments described above, in which the D2D controller 160 does not obtain a first speed of the second device 122 which has already been compared with the third threshold, the D2D controller 160 may need to establish whether the third threshold has not been exceeded. That is, the D2D controller may need to establish if the second device 122 has slowed down below the third threshold, so that a network-controlled D2D communication between the first device 121 and the second device 122 would be stable, which means that the D2D communication would not be likely to fail after a short time.

Therefore, in such embodiments, the D2D controller 160 may establish that the first speed of the second device 122 does not exceed the third threshold, as described above. This is performed by comparing the obtained first speed of the second device 122 with respect to the D2D controller 160 with the third threshold.

Action 305

In some embodiments in which the first device 121 and the second device 122 move at the same or approximately the same speed below the third threshold, a D2D communication may still not be possible between the devices if they are too far from one another. Therefore, in some embodiments, the D2D controller 160 may need to ascertain if the first device 121 and the second device 122 are in sufficient close proximity to allow for a D2D communication. Proximity may be estimated as done above for the first estimation of future proximity of the first device 121 with respect to the second device 122.

In such embodiments, the D2D controller 160 may thus obtain a second estimation of future proximity of the first device 121 with respect to the second device 122, as described above for the first estimation. One difference between the first estimation of future proximity of the first device 121 and the second estimation of future proximity of the first device 121 is that they are taken at two different moments in time.

As explained in reference to action 201, obtaining may comprise measuring or receiving the second estimation of future proximity of the first device 121, as explained below.

In some embodiments, the second estimation of future proximity of the first device 121 may be measured by a network node in the wireless network 100, such as a base station, the first device 121, the second device 122, a wireless device other than the first device 121 and the second device 122, and a network node other than the D2D controller 160. In such embodiments, the D2D controller 160 may then receive the second estimation of future proximity of the first device 121, as measured by the other network node.

In some embodiments, the D2D controller 160 itself may measure the second estimation of future proximity of the first device 121, as described above.

Action 306

In the embodiments in which the D2D controller 160 does not obtain a second estimation of future proximity which has already been compared with a threshold, such as the future proximity threshold, the D2D controller 160 may need to establish whether the future proximity threshold has not been exceeded. Therefore in these embodiments, the D2D controller 160 may establish that the second estimation of future proximity of the first device 121 with respect to the second device 122 does not exceed the future proximity threshold, as described above. This is performed by comparing the obtained second estimation of future proximity of the first device 121 with respect to the second device 122 with the future proximity threshold.

Action 307

As described earlier, the D2D controller 160 manages the D2D communication link 140 between the first device 121 and the second device 122. If the first device 121 has a new, third speed with respect to the D2D controller 160 that is below the third threshold, the network-controlled D2D communication between the first device 121 and the second device 122 may be stable, which means that the network-controlled D2D communication would not be likely to fail after a short time. In these cases, and for the reasons provided above, it would be advantageous to use the network-controlled D2D communication mode. Moreover, in the embodiments in which the D2D controller 160 is co-located with a network node other than the first device 121, if the first device 121 has a third speed with respect to the D2D controller 160 that is below the third threshold, the first device 121 and the second device 122 may remain connected to the D2D controller 160, which means that the management and configuration of the D2D communication may unlikely fail after a short time. This means that when the third speed does not exceed the third threshold, the D2D controller may need to perform an action to use less overhead for the management and control of the D2D link, more efficient communication via the D2D link, and less battery consumption by the devices maintaining the D2D. In some embodiments, this action may be to send a third configuration message to the first device 121 to use a communication mode, i.e., the second communication mode, which is different from the first communication mode that the first device 121 is configured to use. In these embodiments, this second communication mode is a network-controlled D2D communication mode.

Therefore, when the third speed does not exceed the third threshold as described above, the D2D controller 160 may determine that the communication mode should be set to a network-controlled D2D communication mode, and may send a third configuration message to the first device 121 to use a second communication mode, wherein the second communication mode is a network-controlled D2D communication mode, in a similar manner as it sent the first message to the first device 121. The third configuration message will have similar characteristics to the first communication message, and not all will be repeated here. For example, the third configuration message may comprise configuration parameters for the second communication mode, in a similar way as described above for the first configuration message in relation to the first communication mode. These parameters may be different than those used for the first communication mode.

In some embodiments, a communication may be active between the first device 121 and the second device 122. Thus, in some embodiments, the D2D controller 160 may send the third configuration message to the first device 121, when the first speed of the second device 122 is also below the third threshold, and the second estimation of future proximity of the first device 121 with respect to the second device 122 does not exceed the future proximity threshold.

As mentioned above for the first configuration message, in some of these embodiments, a configuration in the third configuration message may be based on the third speed of the first device 121. In some other of these embodiments, the configuration in the third configuration message may be based on the first speed of the second device 122. In some other of these embodiments, the configuration in the third configuration message may be further based on the second estimation of future proximity of the first device 121 with respect to the second device 122. In yet other of these embodiments, the configuration in the third configuration message may be based on all of these factors.

The third configuration message as described in the embodiments above may be: a recommendation for a configuration command, or a configuration command. In the embodiments in which the D2D controller 160 decides which communication mode the first device 121 should use, the third configuration message may be a configuration command. In the embodiments in which the first device 121 decides which communication mode the first device 121 should use, the third configuration message may be a recommendation for a configuration command, as described earlier in relation to the first speed.

A network-controlled D2D mode means that the communication between the first device 121 and the second device 122 is conducted directly from device to device over the D2D link 140, i.e., in a D2D fashion, and not through the network node 110 over the radio links 130 and or/150 or through another similar network node and radio links, but it also means that the D2D communication is managed by the D2D controller 160. As stated earlier, the D2D controller 160 may provision a discovery signal to be used between two devices to determine their proximity and/or D2D link estimation. It may also assign resources for the D2D discovery signal and/or a D2D data channel and/or a D2D control channel. It may relay information between the at least two devices, and it may configure connection parameters for the at least two devices of the D2D link, such as power setting, e.g., actual, min, max, coding and modulation schemes, segmentation configuration, e.g., transport block sizes, parameters and/or security keys for encryption/integrity protection, protocol parameters, which Radio Access Technology, spectrum/carrier to use for D2D link. The actual D2D communication may be based on the same radio technology as the one used on the cellular link, or it may be different. The actual D2D communication may use the same radio spectrum as the cellular link, or it may use different spectrum.

Action 308

In some embodiments, a communication may be active between the first device 121 and the second device 122. In these embodiments, once the D2D controller 160 has sent a third configuration message to the first device 121 to use a second communication mode, it may be necessary to send another message to the second device 122 to also use the same second communication mode, so that the ongoing communication between the devices may continue. In some embodiments, the first device 121 may send this message. In other embodiments, the D2D controller 160 may send this message.

Thus, in this action, when the third speed of the first device 121 and the first speed of the second device 122 do not exceed the third threshold, the D2D controller 160 may send a fourth configuration message to the second device 122 to use the second communication mode, in a similar manner as it sent the third message to the first device 121. The fourth configuration message will have similar characteristics to the third configuration message, and not all will be repeated here. Thus, the fourth configuration message may comprise configuration parameters for the second communication mode, in a similar way as described above for the third configuration message.

Similarly to the third message, the fourth configuration message as described in the embodiments above may be: a recommendation for a configuration command, or a configuration command.

As mentioned above for the third configuration message, in some of these embodiments, a configuration in the fourth configuration message may be based on the third speed of the first device 121. In some other of these embodiments, the configuration in the fourth configuration message may be based on the first speed of the second device 122. In some other of these embodiments, the configuration in the fourth configuration message may be further based on the second estimation of future proximity of the first device 121 with respect to the second device 122. In yet other of these embodiments, the configuration in the fourth configuration message may be based on all of these factors.

The method may either end, or go back to actions 201 or 301, and be repeated totally or partially, as just described.

In order to effectuate the communication mode changes determined by the D2D controller 160 in the actions just described, the configuration messages sent by the D2D controller 160 may be received by the first device 121, which may ultimately implement the configuration changes in order to avoid a communication failure. In some embodiments, the first device 121 may also carry out additional actions, depending on whether it is measuring one or more of the factors the D2D controller is basing its configuration messages on, i.e., speed/s or/and estimation/s of future proximity of the first device 121.

Figure 4:
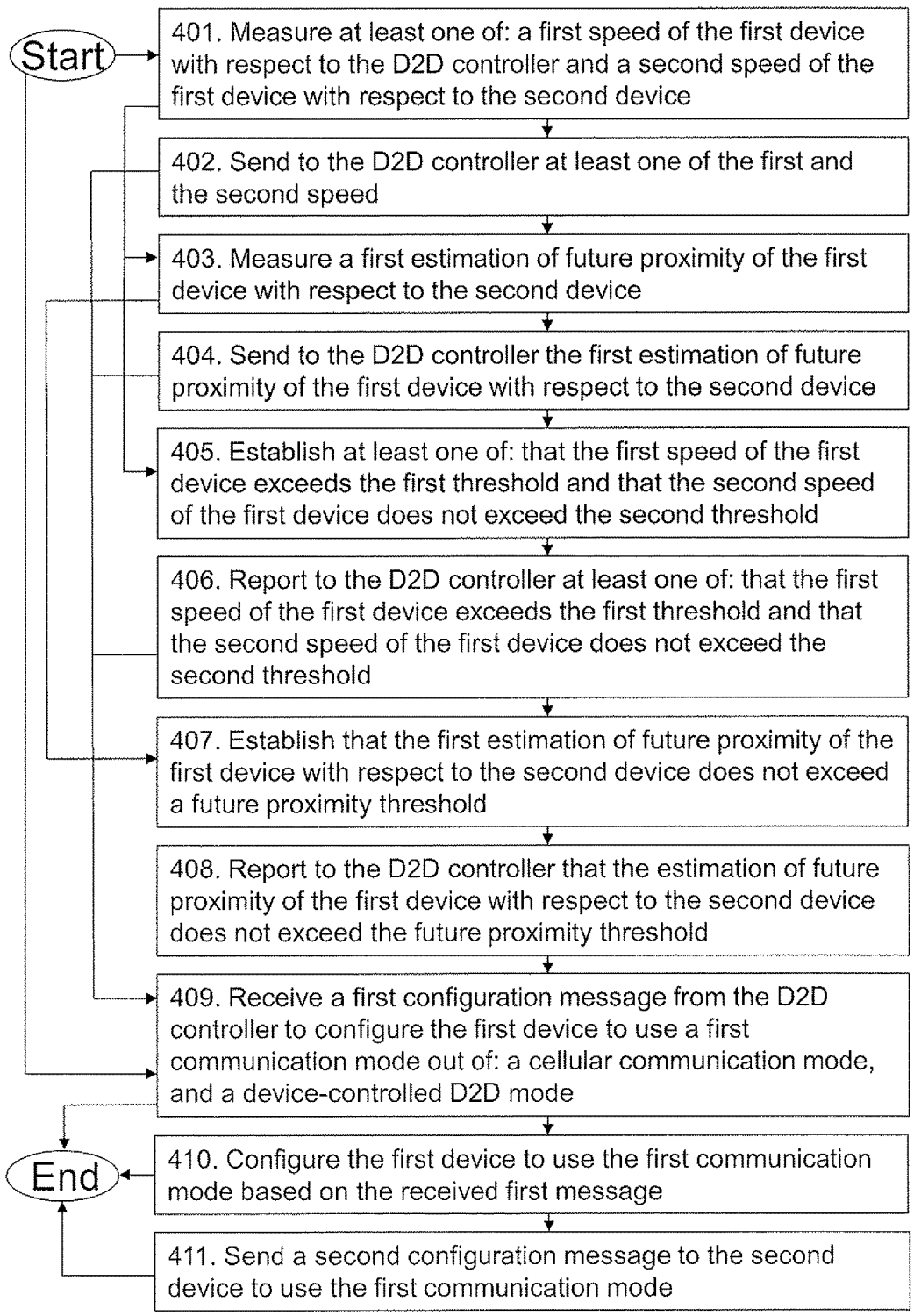
FIG. 4 is a flowchart depicting embodiments of a method in a first device.
Figure 5:
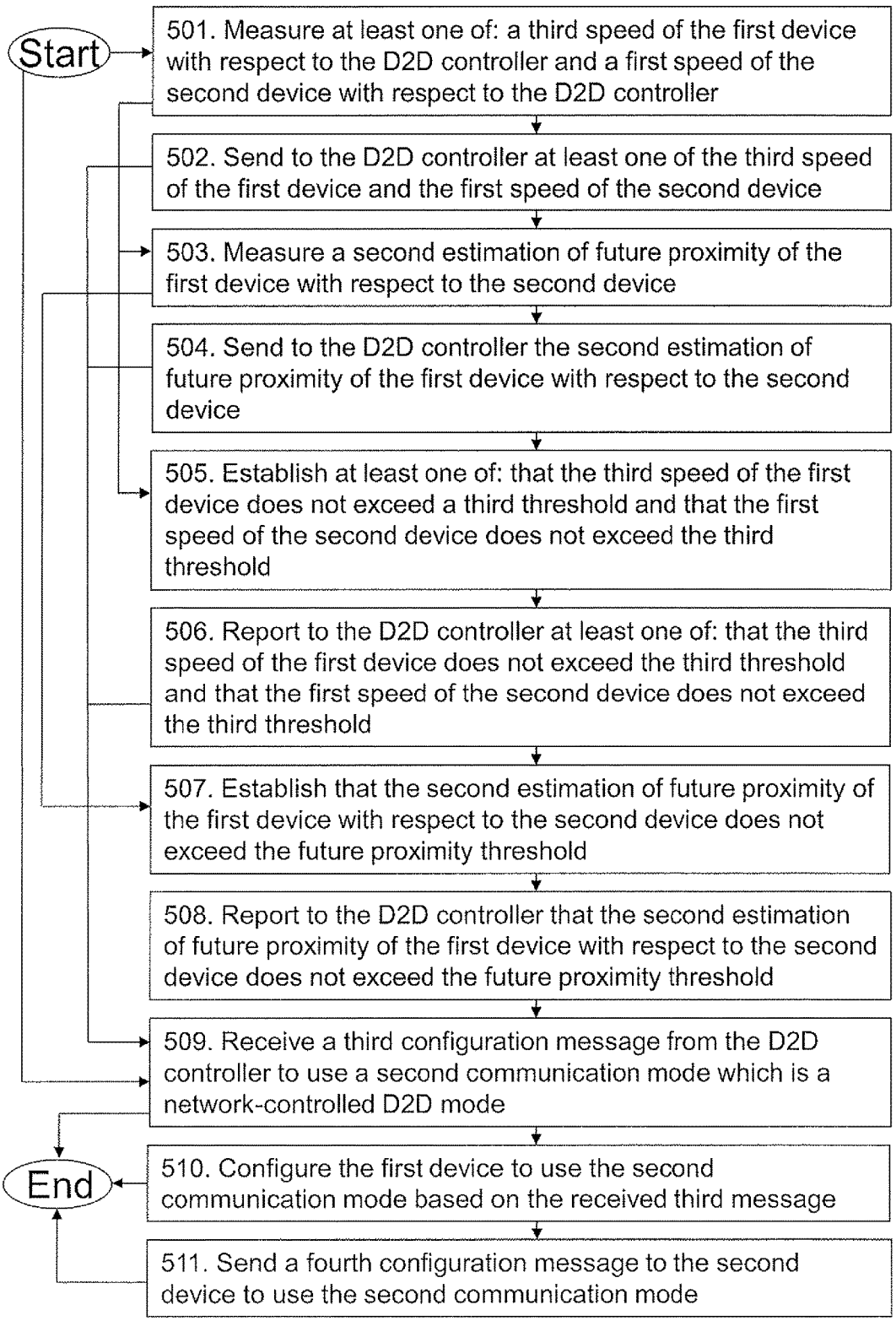
FIG. 5 is a flowchart depicting embodiments of a method in a first device.

Therefore, embodiments of a method in the first device 121 for configuring the first device 121 to use a communication mode will now be described with reference to the flowcharts depicted in FIG. 4 and FIG. 5. As mentioned above, the first device 121 is configured to enable communication with a second device 122 through a network-controlled D2D communication mode, and the D2D controller 160, the first device 121 and the second device 122 are comprised in the wireless network 100.

The method comprises the following actions, which actions may as well be carried out in another suitable order than described below. In some embodiments, all the actions may be carried out, whereas in other embodiments only some action/s may be carried out.

Unless otherwise noted, the factors mentioned in the following description, such as the first speed of the first device 121 and the first threshold, correspond to the same ones described above for FIGS. 2 and 3. Therefore, the accompanying description will not be entirely repeated, for the sake of simplicity.

Action 401

Factors such as speeds of the devices with respect to the D2D controller 160, as well as with respect to each other may affect the stability of the D2D communication between the devices. Therefore, the D2D controller 160 needs to be informed about such factors, which may also include the first estimation of future proximity of the devices with respect to one another.

In some embodiments, these factors may be measured by the first device 121 and then sent to the D2D controller 160. Therefore, in this action, the first device 121 may measure at least one of: the first speed of the first device 121 with respect to the D2D controller 160, and a second speed of the first device 121 with respect to the second device 122. This measurement/s may be carried out, for example, via device positioning.

Typically, the first speed of the first device 121 may be measured first, to be able to determine if the first device 121 is going too fast to be able to maintain a network controlled D2D communication, i.e., going above the first threshold. Typically, the second speed of the first device 121 may only be measured if needed. However, in some embodiments both speeds may be measured at the same or approximately the same time, and in others the second speed may be measured first.

The first speed of the first device 121, the second speed of the first device 121, and the first threshold correspond to the first speed, second speed and first threshold described above for FIG. 2, respectively. Also, the reasons why these speeds and threshold would be needed correspond to the reasons provided above for FIG. 2. Therefore, a description or explanation will not be repeated here for the sake of simplicity.

In some of these embodiments at least one of the measured speeds may be the result of a comparison of speed/s, or a comparison of speeds and thresholds, such as the first and second thresholds, while in others, the measured speed/s may not be a result of such a comparison.

Action 402

In order for the D2D controller 160 to be informed about at least one of the first and second speeds of the first device 121, so that it may ultimately determine which configuration mode the first device 121 should use in order to maintain a stable communication with the second device 122, the first device 121 may send to the D2D controller 160 at least one of: the first speed of the first device 121 and the second speed of the first device 121. This measurement may be sent, for example, via an RRC protocol.

Action 403

As described above for FIG. 2, in some embodiments in which the first device 121 is going too fast to be able to maintain a network controlled D2D communication, i.e., going above the first threshold, the D2D controller 160 may make a determination on whether a D2D communication mode between the first device 121 and the second device 122 would still be possible by setting the communication mode to a device-controlled D2D mode. In these embodiments, the speed of the first device 121 with respect to the second device 122 may be taken into consideration, as may be the first estimation of future proximity of the first device 121 with respect to the second device 122. In these embodiments, the D2D controller may need to be informed also about this factor.

Therefore, in some embodiments, the first device 121 may additionally measure a first estimation of future proximity of the first device 121 with respect to the second device 122, as described above.

The first estimation of future proximity of the first device 121 with respect to the second device 122 corresponds to the first estimation of future proximity of the first device 121 with respect to the second device 122 described above for FIG. 2. Therefore, a description or explanation will not be repeated here for the sake of simplicity.

Action 404

In order for the D2D controller 160 to be informed about the first estimation of future proximity of the first device 121, so that it may ultimately determine which configuration mode the first device 121 should use, the first device 121 may send to the D2D controller 160 the first estimation of future proximity of the first device 121 with respect to the second device 122. The estimation may be sent, for example, via an RRC protocol.

Action 405

Similarly to what was described earlier for FIG. 2, in the embodiments in which the first device 121 does not measure the first speed of the first device 121 or the second speed of the first device 121, which have already been compared with a first threshold or a second threshold, respectively, the first device 121 may need to establish whether these thresholds have been exceeded, and not exceeded, respectively.

Therefore, in some embodiments, the first device 121 may establish at least one of: that the first speed of the first device 121 exceeds the first threshold and that the second speed of the first device 121 does not exceed the second threshold, as described above. This may be performed by comparing the obtained first speed of the first device 121 with the first threshold and the second speed of the first device with the second threshold, in a similar way to that described for FIG. 2.

Typically, the first device 121 may establish first that the first speed of the first device 121 exceeds the first threshold and then that the second speed of the first device 121 does not exceed the second threshold. But in other embodiments these establishment steps may be done simultaneously or in a different order.

Action 406

As described above, in some embodiments, the first device 121 may establish at least one of: that the first speed of the first device 121 exceeds the first threshold and that the second speed of the first device 121 does not exceed the second threshold. In these embodiments, the first device 121 may need to report to the D2D controller 160 the results of this establishment or establishments.

Therefore, in action 406, the first device 121 may report to the D2D controller 160 at least one of: that the first speed of the first device 121 exceeds the first threshold and that the second speed of the first device 121 does not exceed the second threshold. These value/s may be reported, for example, via an RRC protocol.

Action 407

Similarly to what was described earlier for FIG. 2, in the embodiments in which the first device 121 does not measure the first estimation of future proximity which has already been compared with the future proximity threshold, the first device 121 may need to establish whether the future proximity threshold has been exceeded or not. Therefore in these embodiments, the D2D controller 160 may establish that the first estimation of future proximity of the first device 121 with respect to the second device 122 does not exceed the future proximity threshold, as described above. This is performed by comparing the first estimation of future proximity of the first device 121 with the future proximity threshold, in a similar way to that described for FIG. 2.

Action 408

As described above, in some embodiments, the first device 121 may establish that the first estimation of future proximity of the first device 121 with respect to the second device 122 does not exceed the future proximity threshold. In these embodiments, the first device 121 may need to report to the D2D controller 160 the results of this establishment.

Therefore, in action 408, the first device 121 may report to the D2D controller 160 that the first estimation of future proximity of the first device 121 with respect to the second device 122 does not exceed the future proximity threshold. This may be reported, for example, via an RRC protocol.

Action 409

The first device 121 may carry out one or more measurements of the speeds and first estimation of future proximity of the device 121, or another network node may do this instead. The first device 121 may also establish whether the first speed has been exceeded, or another structure may do this. In either case, when the first speed of the first device 121 with respect to the D2D controller 160 exceeds the first threshold, as a result of the actions performed by the D2D controller 10, the first device 121 receives the first configuration message from the D2D controller 160, to configure the first device 121 to use the first communication mode, wherein the first communication mode is one of a cellular communication mode, and a device-controlled D2D mode, for the reasons described above in reference to FIG. 2. This first configuration message is equivalent to that sent by the D2D controller 160 as described in reference to FIG. 2, and will therefore not be described again. This may be received, for example, via an RRC protocol.

Figure 2:
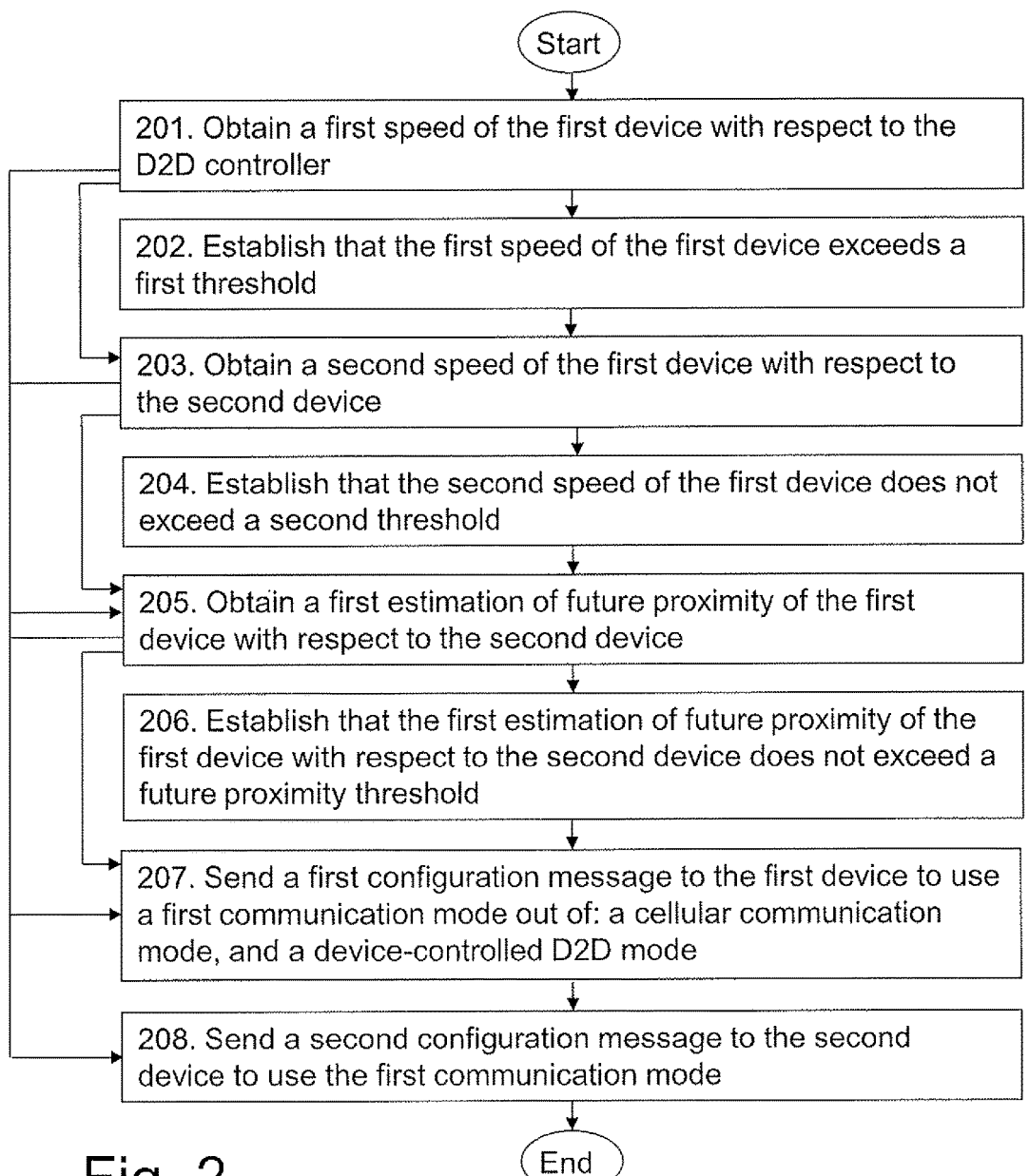
FIG. 2 is a flowchart depicting embodiments of a method in a D2D controller.
Figure 3:
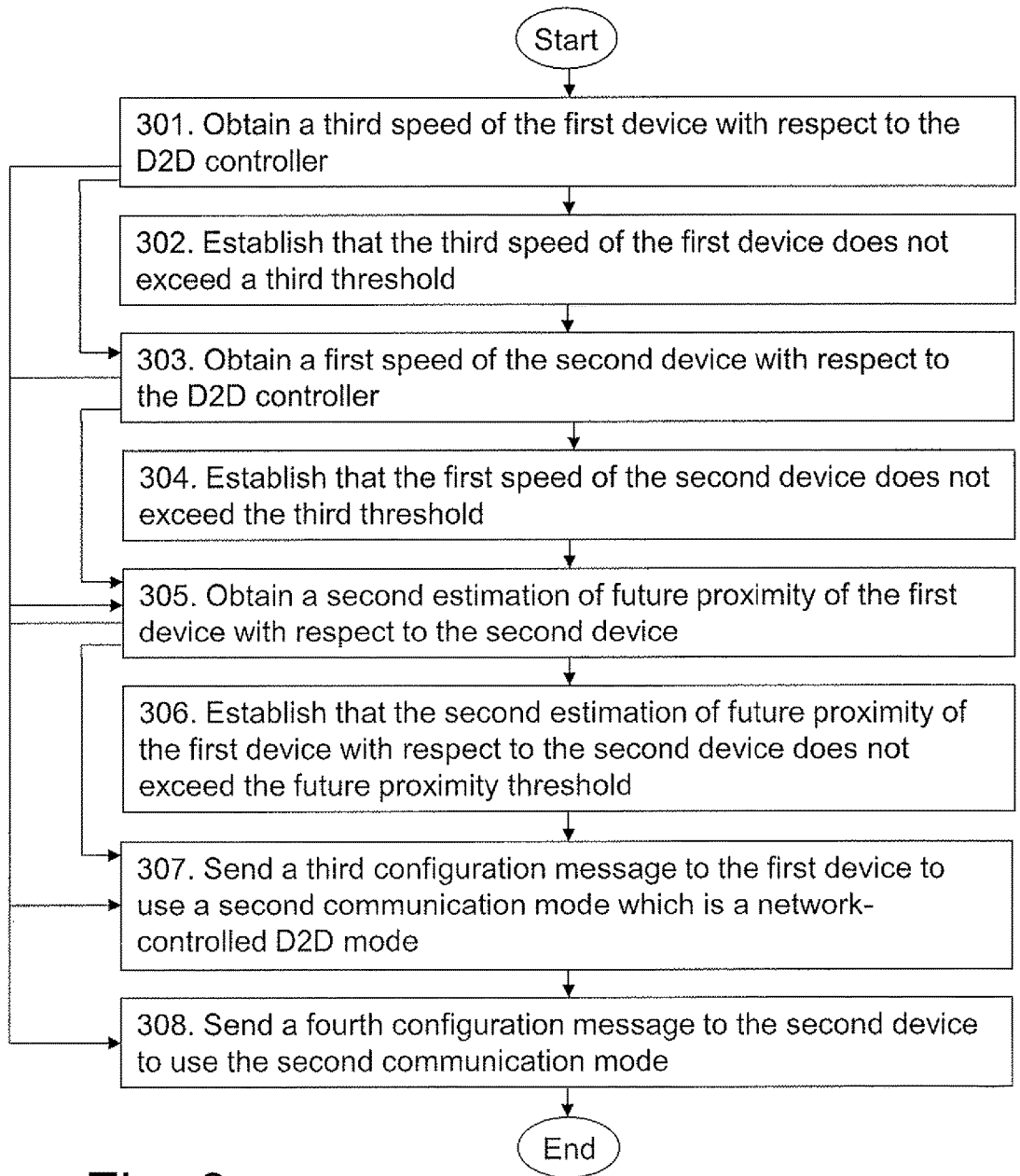
FIG. 3 is a flowchart depicting embodiments of a method in a D2D controller.

The determination of which communication mode may be contained in the configuration message, is also be the same as that described in reference to FIG. 2.

The method may either proceed to action 410, end, or go back to actions 401 or 403 and be repeated totally or partially, as just described. Otherwise, it may continue to the method described in FIG. 5

Action 410

Once the first device 121 receives the first configuration message from D2D controller 160, in some embodiments it may configure the first device 121 to use the first communication mode, based on the received first message, in order to prevent a communication failure with the second device 122. This may happen in embodiments in which the first device 121 does not decide which communication mode to use, and simply effectuates the orders received from the D2D controller 160, as well as in embodiments in which the first device 121 is the one taking the decision on which communication mode to use, based on a recommendation from the D2D controller 160.

Therefore, in these embodiments, the first device 121 configures the first device 121 to use the first communication mode based on the received first message from D2D controller 160. In some embodiments, the configuration may be usage of a specific discovery signal to be used between the first device 121 and the second device 122, to determine their proximity and/or D2D link estimation. In other embodiments, the configuration may be restricting resource usage of the D2D link to resource assignment for the D2D discovery signal and/or a D2D data channel and/or a D2D control channel. In other embodiments, the configuration may be a configuration of connection parameters for the at least two devices of the D2D link, such as power setting, e.g., actual, min, max, coding and modulation schemes, segmentation configuration, e.g., transport block sizes, parameters and/or security keys for encryption/integrity protection, protocol parameters. In other embodiments, the configuration may be a selection of the radio technology and spectrum/carrier to be used for the D2D link. In some embodiments, the actual D2D communication may be based on the same radio technology as the one used on the cellular link. In other embodiments, it may be different. In some embodiments, the actual D2D communication may use the same radio spectrum as the cellular link, while in other embodiments, it may use a different spectrum.

In some embodiments in which the first device 121 is the one taking the decision on which communication mode to use, based on a recommendation from the D2D controller 160, action 410 may not be taken if the first device 121 decides not to follow the recommendation from the D2D controller 160.

In the embodiments that do take action 410, the method may either proceed to action 411, end, or go back to actions 401 or 403 and be repeated totally or partially, as just described. Otherwise, it may continue to the method described in FIG. 5.

Action 411

As described earlier on FIG. 2, in some embodiments, a communication may be active between the first device 121 and the second device 122. In these embodiments, once the D2D controller 160 has sent the first configuration message to the first device 121 to use a first communication mode, it may be necessary to send another message to the second device 122 to also use the same first communication mode, so that the ongoing communication between the devices may continue. In some embodiments, the first device 121 may send this message Thus, in this action, the first device 121 may send the second configuration message to the second device 122 to use the first communication mode. The second configuration message may have similar characteristics to the first configuration message, and not all will be repeated here. For example, the second configuration message may comprise configuration parameters for the first communication mode, as described above for the first configuration message, but here, in relation to the configuration of the second device 122.

As mentioned above for the first configuration message, in some of these embodiments, a configuration in the second configuration message may be based on the first speed of the first device 121. In some other of these embodiments, the configuration in the second configuration message may be based on the second speed of the first device 121. In some other of these embodiments, the configuration in the second configuration message may be further based on the first estimation of future proximity of the first device 121 with respect to the second device 122. In yet other of these embodiments, the configuration in the second configuration message may be based on all of these factors.

In the embodiments that do take action 411, the method may either end, go back to actions 401 or 403 and be repeated totally or partially, as just described. Otherwise, it may continue to the method described in FIG. 5.

Action 501

As described earlier, in some embodiments, the first device 121 may have exceeded the first speed threshold. In some of these embodiments, the D2D controller 160 may proceed with further actions if the speed of the first device 121 slows down enough to be able to re-establish a network-controlled D2D communication. This may be determined by comparing the third speed of the first device 121 with the third threshold, as described above. In such embodiments, the D2D controller 160 may determine that a network-controlled D2D communication would be possible and may therefore send the third configuration message to use a second communication mode to the first device 121, described earlier for FIG. 3.

In some embodiments, in order to ascertain whether a network-controlled D2D communication may be possible, the D2D controller 160 may need to obtain the third speed of the first device 121 with respect to the D2D controller 160, and the first speed of the second device 122 with respect to the D2D controller 160. And in some of these embodiments, this third speed of the first device 121 and first speed of the second device 122 may be measured by the first device 121 and then sent to the D2D controller 160, similarly to how it was described above for the first speed of the first device 121.

Therefore, in this action, the first device 121 may measure at least one of: the third speed of the first device 121 with respect to the D2D controller 160 and the first speed of the second device 122 with respect to the D2D controller 160.

The third speed of the first device 121, first speed of the second device 122, and the third threshold correspond to the third speed and the third threshold, respectively, described above for FIG. 3. Also, the reasons why this speed and threshold would be needed correspond to the reasons provided above for FIG. 3. Therefore, a description or explanation will not be repeated here for the sake of simplicity.

Action 502

In order for the D2D controller 160 to be informed about the third speed of the first device 121 and/or the first speed of the second device 122, so that it may ultimately determine which configuration mode the first device 121 should use, and at the same time keep a stable communication with the second device 122, the first device 121 may send to the D2D controller 160 at least one of: the third speed of the first device 121, and the first speed of the second device 122, in a similar fashion as it sent the first speed of the first device 121.

Action 503

As described above for FIG. 3, in some embodiments in which the first device 121 is going too fast to be able to maintain a network controlled D2D communication, i.e., going above the first threshold, the D2D controller 160 may make a determination on whether a D2D communication mode between the first device 121 and the second device 122 would still be possible by setting the communication mode to a device-controlled D2D mode. In these embodiments, the speed of the first device 121 with respect to the second device 122 may be taken into consideration, as may be a second estimation of future proximity of the first device 121 with respect to the second device 122. In these embodiments, the D2D controller may need to be informed also about this factor.

Therefore, in some embodiments, the first device 121 may additionally measure a second estimation of future proximity of the first device 121 with respect to the second device 122, as described above. The second estimation of future proximity of the first device 121 with respect to the second device 122 corresponds to the second estimation of future proximity of the first device 121 with respect to the second device 122, described above for FIG. 3. Also, the reasons why this second estimation would be needed correspond to the reasons provided above for FIG. 3. Therefore, a description or explanation will not be repeated here for the sake of simplicity.

Action 504

In order for the D2D controller 160 to be informed about the second estimation of future proximity of the first device 121, so that it may ultimately determine which configuration mode the first device 121 should use, the first device 121 may send to the D2D controller 160 the second estimation of future proximity of the first device 121 with respect to the second device 122. The estimation may be sent, for example, via an RRC protocol.

Action 505

In some embodiments in which the first device 121 does not measure the third speed of the first device 121 and/or the first speed of the second device 122, which have already been compared with the third threshold, the first device 121 may need to establish whether the third threshold has not been exceeded or whether it has. That is, the first device 121 may need to establish if the first device 121 and/or second device 122 have slowed down below the third threshold, so that a network-controlled D2D communication between the first device 121 and the second device 122 would be stable, which means that the network-controlled D2D communication would not be likely to fail after a short time.

Therefore, in such embodiments, the first device 121 may establish at least one of: that the third speed of the first device 121 does not exceed the third threshold and that the first speed of the second device 122 does not exceed the third threshold. This is performed by comparing the measured third speed of the first device 121 and/or the first speed of the second device 122 with the third threshold, as described above.

Action 506

As described above, in some embodiments, the first device 121 may establish that the third speed of the first device 121 does not exceed the third threshold and that the first speed of the second device 122 does not exceed the third threshold. In these embodiments, the first device 121 may need to report to the D2D controller 160 the results of this establishment/s.

Therefore, in action 506, the first device 121 may report to the D2D controller 160 at least one of: that the third speed of the first device 121 does not exceed the third threshold and that the first speed of the second device 122 does not exceed the third threshold, in a similar fashion as it reported that the first speed of the first device 121 exceeds the first threshold.

Action 507

Similarly to what was described earlier for FIG. 3, in the embodiments in which the first device 121 does not measure a second estimation of future proximity which has already been compared with the future proximity threshold, the first device 121 may need to establish whether the future proximity threshold has been exceeded or not. Therefore in these embodiments, the D2D controller 160 may establish that the second estimation of future proximity of the first device 121 with respect to the second device 122 does not exceed the future proximity threshold, as described above. This is performed by comparing the second estimation of future proximity of the first device 121 with the future proximity threshold, in a similar way to that described for FIG. 3.

Action 508

As described above, in some embodiments, the first device 121 may establish that the second estimation of future proximity of the first device 121 with respect to the second device 122 does not exceed the future proximity threshold. In these embodiments, the first device 121 may need to report to the D2D controller 160 the results of this establishment.

Therefore, in action 508, the first device 121 may report to the D2D controller 160 that the second estimation of future proximity of the first device 121 with respect to the second device 122 does not exceed the future proximity threshold. This may be reported, for example, via an RRC protocol.

Action 509

As explained earlier for FIG. 3, the D2D controller 160 manages the D2D communication link 140 between the first device 121 and the second device 122. If the first device 121 has a new, third speed with respect to the D2D controller 160 that is below the third threshold, a network-controlled D2D communication between the first device 121 and the second device 122 may be stable. This means that the D2D communication may not be likely to fail after a short time. Moreover, in the embodiments in which the D2D controller 160 is co-located with a network node other than the first device 121, if the first device 121 has a third speed with respect to the D2D controller 160 that is below the third threshold, the first device 121 and the second device 122 may remain connected to the D2D controller 160, which means that the management and configuration of the D2D communication may unlikely fail after a short time.

This means that when the third speed does not exceed the third threshold, the D2D controller needs to perform an action to use less overhead for the management and control of the D2D link, have a more efficient communication via the D2D link, and less battery consumption by the devices maintaining the D2D, as explained earlier. In some embodiments, this action is to send a third configuration message to the first device 121 to use a communication mode, i.e., the second communication mode, which is different from the first communication mode that the first device 121 is configured to use. This second communication mode is a network-controlled D2D communication mode.

Therefore, when the third speed of the first device 121 with respect to the D2D controller 160 does not exceed the third threshold, as a result of the actions performed by the D2D controller 10, the first device 121 may receive a third configuration message from the D2D controller 160 to use a second communication mode, wherein the second communication mode is a network-controlled D2D communication mode for the reasons described above in reference to FIG. 3. This may happen in embodiments whether the first device 121 itself carries out the measurement of the third speed or not, and whether the device 121 establishes that the third speed has not exceeded the third threshold, or whether this is done by the D2D controller 160 or by another network node. This third configuration message corresponds to the third configuration message described in reference to FIG. 3, and will therefore not be described again. For example, as stated above, in some embodiments, the third configuration message may be one of: a recommendation for a configuration command, and a configuration command. This second message may also be received by the first device 121 in the same manner as the first message.

In some embodiments, a communication may be active between the first device 121 and the second device 122. Thus, in some embodiments, the first device 121 may receive the third configuration message from the D2D controller 160, when the first speed of the second device 122 is also below the third threshold, and the second estimation of future proximity of the first device 121 with respect to the second device 122 does not exceed the future proximity threshold.

Action 510

Once the first device 121 receives the third configuration message from D2D controller 160, in some embodiments it may configure the first device 121 to use the second communication mode based on the received third message in order to prevent a communication failure with the second device 122. This may happen in embodiments in which the first device 121 does not decide which communication mode to use, and simply effectuates the orders received from the D2D controller 160, as well as in embodiments in which the first device 121 is the one taking the decision on which communication mode to use, based on a recommendation from the D2D controller 160.

Therefore, in these embodiments, the first device 121 may configure the first device to use the second communication mode based on the received third message from D2D controller 160, in a manner similar as that described above.

In some embodiments in which the first device 121 is the one taking the decision on which the communication mode to use, based on a recommendation from the D2D controller 160, action 510 may not be taken. The method may then end, go back to actions 401, 403 or 501, and be repeated totally or partially, as just described. Otherwise, it may proceed to action 511.

Action 511

As described earlier, in some embodiments, a communication may be active between the first device 121 and the second device 122. In these embodiments, once the D2D controller 160 has sent a third configuration message to the first device 121 to use a second communication mode, it may be necessary to send another message to the second device 122 to also use the same second communication mode, so that the ongoing communication between the devices may continue. In some embodiments, the first device 121 may send this message.

Thus, in this action, the first device 121 may send a fourth configuration message to the second device 122 to use the second communication mode. The fourth configuration message may have similar characteristics to the third configuration message, and not all will be repeated here. For example, the fourth configuration message may comprise configuration parameters for the second communication mode, as described above for the third configuration message, but here, in relation to the configuration of the second device 122.

As mentioned above for the third configuration message, in some of these embodiments, a configuration in the fourth configuration message may be based on the third speed of the first device 121. In some other of these embodiments, the configuration in the fourth configuration message may be based on the first speed of the second device 122. In some other of these embodiments, the configuration in the fourth configuration message may be further based on the second estimation of future proximity of the first device 121 with respect to the second device 122. In yet other of these embodiments, the configuration in the second configuration message may be based on all of these factors.

In the embodiments that do take action 511, the method may either end, or go back to actions 401, 403 or 501 and be repeated totally or partially, as just described.

Figure 6:
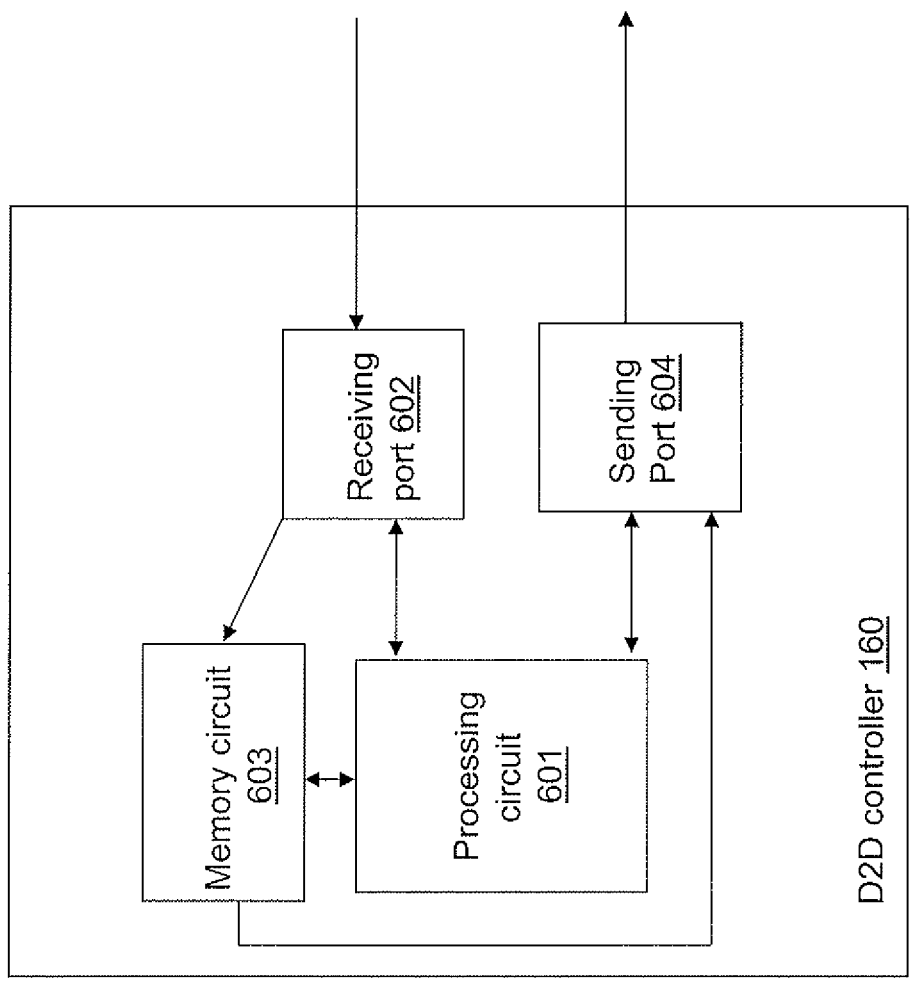
FIG. 6 is a schematic block diagram illustrating embodiments of a D2D controller.

To perform the method actions in the D2D controller 160 described above in relation to FIGS. 2, 3, 4 and 5 for sending the configuration message to use a communication mode to the first device 121, the D2D controller 160 comprises the following arrangement depicted in FIG. 6. As mentioned above, the first device 121 is configured to enable communication with the second device 122 through a network-controlled D2D communication mode. The D2D controller 160, the first device 121 and the second device 122 are arranged to be comprised in the wireless network 100.

The D2D controller 160 comprises a processing circuit 601. The processing circuit 601 may comprise one more processors, together with computer program code for performing the functions and actions of the embodiments herein. The program code mentioned above may also be provided as a computer program product, for instance in the form of a data carrier carrying computer program code for performing the embodiments herein when being loaded into the in the D2D controller 160. One such carrier may be in the form of a CD ROM disc. It is however feasible with other data carriers such as a memory stick. The computer program code may furthermore be provided as pure program code on a server and downloaded to the D2D controller 160. One or more of the processors comprised in processing circuit 601, as well as the other digital hardware, may be included in a single application-specific integrated circuit (ASIC), or several processors and various digital hardware may be distributed among several separate components, whether individually packaged or assembled into a system-on-a-chip (SoC).

The processing circuit 601 is configured to obtain the first speed of the first device 121 with respect to the D2D controller 160. In the embodiments in which the first speed is received from another structure, the first speed may be received by the D2D controller 160 through a receiving port 602. In some embodiments, the receiving port 602 may be, for example, connected to a positioning sensor, e.g., GPS. In other embodiments, the receiving port 602 may be a network based positioning service via a corresponding communication protocol. The receiving port 602 may be configured to receive any of the first, second and/or third speeds of the first device 121, the first speed of the second device 122, the first and second estimations of future proximity of the first device 121, and/or any of the reports that the first speed of the first device 121 exceeds the first threshold, that the second speed of the first device 121 does not exceed the second threshold and that the third speed of the first device 121 does not exceed the third threshold, that the first speed of the second device 122 does not exceed the third threshold, and/or that the first or second estimations of future proximity of the first device 121 with respect to the second device 122 do not exceed the future proximity threshold, in the embodiments in which these factors are received from another structure, such as the first device 121, as will be described below.

Since the receiving port 602 may be in communication with the processing circuit 601, the receiving port 602 may then send the obtained first speed to the processing circuit 601. In the embodiments in which the D2D controller itself measures the first speed, the processing circuit 601 may receive necessary information to measure the first speed, also via the receiving port 602. The information received or measured by the processing circuit 601 in relation to obtaining the first speed, may be stored in a memory circuit 603, which may be in communication with the processing circuit 601 and the receiving port 602.

The processing circuit 601 is further configured to send the first configuration message to the first device 121 to use the first communication mode when the first speed of the first device 121 exceeds the first threshold, wherein the first communication mode is one of the following communication modes: a cellular communication mode, and a device-controlled D2D mode. The first configuration message may be first stored in memory circuit 603, or may be directly sent to the first device through a sending port 604, which may be in communication with the processing circuit 601, and the memory circuit 603. In some embodiments, the sending port 604 may be a transceiver with a communication channel.

In some embodiments, the processing circuit 601 is further configured to send a second configuration message to the second device 122 to use the first communication mode. The second configuration message may be first stored in memory circuit 603, or may be directly sent to the second device 122 through the sending port 604, which may be in communication with the processing circuit 601, and the memory circuit 603.

In some embodiments, the processing circuit 601 is further configured to establish that the first speed of the first device 121 exceeds the first threshold. The result of the establishment action may also be stored in the memory circuit 603.

In some embodiments, the processing circuit 601 may be further configured to obtain the second speed of the first device 121 with respect to the second device 122. In the embodiments in which the second speed is received from another network node, the second speed may be received by the D2D controller 160 through the receiving port 602. The receiving port 602 may then send the obtained second speed to the processing circuit 601. In the embodiments in which the D2D controller itself measures the second speed, the processing circuit 601 may receive necessary information to measure the second speed, also via the receiving port 602. The information received or measured by the processing circuit 601 in relation to obtaining the second speed, may be stored in the memory circuit 603.

In some embodiments, the processing circuit 601 is further configured to obtain a first estimation of future proximity of the first device 121 with respect to the second device 122. Similarly to what was just described for the first and second speeds, either the first estimation of future proximity of the first device, or information related to it may be received by the D2D controller 160 through the receiving port 602, and may be stored in the memory circuit 603.

In some embodiments, the processing circuit 601 is further configured to establish at least one of: that the second speed of the first device 121 does not exceed the second threshold and that the first estimation of future proximity of the first device 121 with respect to the second device 122 does not exceed a future proximity threshold. Similarly to what was described above, the result of this establishment action may also be stored in the memory circuit 603.

In some embodiments, the processing circuit 601 is further configured to obtain the third speed of the first device 121 with respect to the D2D controller 160. The third speed may be obtained in a similar manner as was described above for the first speed of the first device 121.

The processing circuit 601 may be further configured to send a third configuration message to the first device 121 to use the second communication mode when the third speed does not exceed the third threshold, wherein the second communication mode is a network-controlled D2D communication mode. The third configuration message may be sent to the first device 121 in a similar manner as was described above for the first configuration message.

The processing circuit 601 may be further configured to one of: obtain a first speed of the second device 122 with respect to the D2D controller 160, obtain a second estimation of future proximity of the first device 121 with respect to the second device 122, and when the first speed of the second device 122 does not exceed the third threshold, send a fourth configuration message to the second device 122 to use the second communication mode.

In some embodiments, the processing circuit 601 is further configured to one of: receive at least one of: the first speed of the first device 121, the second speed of the first device 121, the third speed of the first device 121, the first estimation of future proximity of the first device 121, the first speed of the second device 122, and the second estimation of future proximity of the first device 121 from one of: a base station, the first device 121, the second device 122, a wireless device other than the first device 121 and the second device 122, and a network node other than the D2D controller 160, and measure at least one of: the first speed of the first device 121, the second speed of the first device 121, the third speed of the first device 121, the first estimation of future proximity of the first device 121, the first speed of the second device 122, and the second estimation of future proximity of the first device 121. This information may be received by the processing D2D controller 160 in a similar manner as it was described above for the obtained information.

In some embodiments, the D2D controller 160 may be co-located with a network node. The network node may be one of: a base station, a stationary relay node, a mobile relay node, the first device 121, the second device 122, and a wireless device other than the first device 121 and the second device 122.

In some embodiments at least one of the first speed of the first device 121, the second speed of the first device 121, the third speed of the first device 121 and the first speed of the second device 122 is obtained by any one of: absolute velocity, Doppler shift, signal variations over time for pilot signals, handover events, and a positioning method.

The D2D controller 160 may be a stationary D2D controller and at least one of the first speed of the first device 121, the third speed of the first device 121 and the first speed of the second device 122 is an absolute device velocity.

In some embodiments, at least one of the first, second, third and fourth configuration messages is one of: a recommendation for a configuration command, and a configuration command, as described above in relation to FIGS. 2 and 3.

Memory circuit 603 may comprise one or more memory units. The memory circuit 603 is arranged to be used to store data such as, the first, second and/or third speeds of the first device 121, the first speed of the second device 122, the first and second estimations of future proximity of the first device 121, and/or any of the reports that the first speed of the first device 121 exceeds the first threshold, that the second speed of the first device 121 does not exceed the second threshold, that the third speed of the first device 121 does not exceed the third threshold, that the first speed of the first device 121 does not exceed the third threshold, and/or that the first or second estimations of future proximity of the first device 121 with respect to the second device 122 does not exceed the future proximity threshold, and applications to perform the methods herein when being executed in the D2D controller 160. Any of the other information processed by the processing unit 601, such as the first, second, third and/or fourth configuration messages, the first, second, third and future proximity thresholds, or the results of the establishment actions may also be stored in the memory circuit 603.

Figure 7:
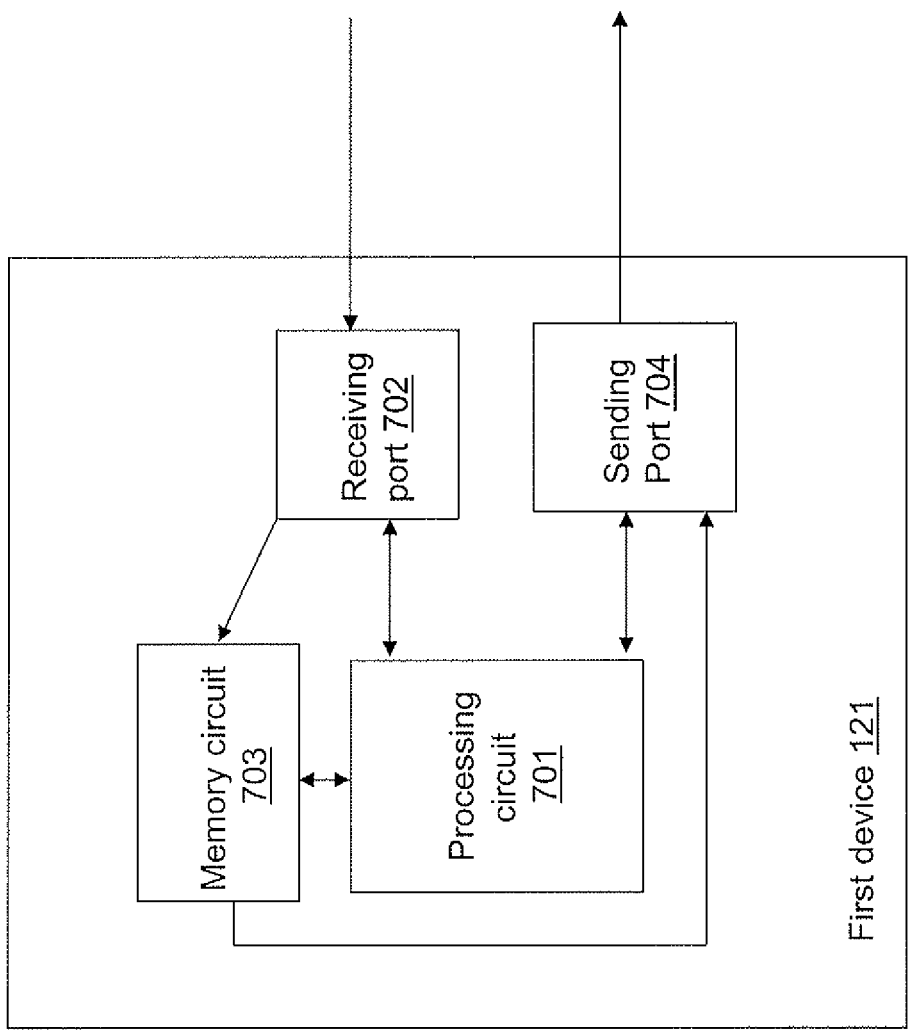
FIG. 7 is a schematic block diagram illustrating embodiments of a first device.

To perform the method actions in the first device 121 described above in relation to FIGS. 4 and 5 for configuring the first device 121 to use a communication mode, the first device 121 comprises the following arrangement depicted in FIG. 7. As mentioned above, the first device 121 is configured to enable communication with the second device 122 through a network-controlled D2D communication mode. The D2D controller 160, the first device 121 and the second device 122 are arranged to be comprised in the wireless network 100.

The first device 121 comprises a processing circuit 701 comprising one or more processors, together with computer program code for performing the functions and actions of the embodiments herein. The program code mentioned above may also be provided as a computer program product, for instance in the form of a data carrier carrying computer program code for performing the embodiments herein when being loaded into the in the first device 121. One such carrier may be in the form of a CD ROM disc. It is however feasible with other data carriers such as a memory stick. The computer program code may furthermore be provided as pure program code on a server and downloaded to the first device 121. One or more of the processors comprised in processing circuit 701, as well as the other digital hardware, may be included in a single application-specific integrated circuit (ASIC), or several processors and various digital hardware may be distributed among several separate components, whether individually packaged or assembled into a system-on-a-chip (SoC).

The processing circuit 701 is configured to receive the first configuration message from the D2D controller 160, to configure the first device 121 to use the first communication mode when the first speed of the first device 121 with respect to the D2D controller 160 exceeds the first threshold, wherein the first communication mode is one of the following communication modes: a cellular communication mode, and a device-controlled D2D mode. The first configuration message may be received by the first device 121 through a receiving port 702. The receiving port 702 may be a transceiver terminating a communication protocol such as RRC. The receiving port 702 may in communication with the processing circuit 701. The receiving port 702 may then send the received first configuration message to the processing circuit 701. The first configuration message received by the processing circuit 701 may be stored in a memory circuit 703, which may be in communication with the processing circuit 701 and the receiving port 702.

The processing circuit 701 is further configured to configure the first device to use the first communication mode based on the received first message.

In some embodiments, the processing circuit 701 is further configured to send a second configuration message to the second device 122 to use the first communication mode. The second configuration message may be first stored in memory circuit 703, or may be directly sent to the second device 122 through a sending port 704, which may in communication with the processing circuit 701, and the memory circuit 703. In some embodiments, the sending port 704 may be a transceiver with a communication channel.

In some embodiments, the processing circuit 701 is further configured to receive the third configuration message from the D2D controller 160 to use the second communication mode when the third speed of the first device 121 with respect to the D2D controller 160 does not exceed the third threshold, wherein the second communication mode is a network-controlled D2D communication mode. This may be done in a similar manner as described earlier for the first configuration message.

In some embodiments, the processing circuit 701 is further configured to configure the first device to use the second communication mode based on the received third message.

In some embodiments, the processing circuit 701 is further configured to measure at least one of: the first speed of the first device 121 with respect to the D2D controller 160, the second speed of the first device 121 with respect to the second device 122, the third speed of the first device 121 with respect to the D2D controller 160, and the first speed of the second device 122 with respect to the D2D controller 160. As stated above, any of these measurements as well as any information that may have been used by the first device 121 in order to measure any of the speeds, may also be stored in the memory circuit 703.

In some embodiments, the processing circuit 701 is further configured to send to the D2D controller 160 at least one of: the first speed of the first device 121, the second speed of the first device 121, the third speed of the first device 121, and the first speed of the second device 122. As stated earlier, any of these speeds may be first stored in memory circuit 703, or may be directly sent to the D2D controller 160 through the sending port 704.

In some embodiments, the processing circuit 701 is further configured to: measure at least one of: the first estimation of future proximity of the first device 121 with respect to the second device 122, and the second estimation of future proximity of the first device 121 with respect to the second device 122. As stated earlier, the first estimation of future proximity as well as any information that may have been obtained by the first device 121 in order to calculate the first estimation of future proximity, may also be stored in the memory circuit 703.

In some embodiments, the processing circuit 701 is further configured to send to the D2D controller 160 at least one of: the first estimation of future proximity of the first device 121 with respect to the second device 122, and the second estimation of future proximity of the first device 121 with respect to the second device 122. This may be done in a similar manner as described earlier for the speeds.

The processing circuit 701 may be further configured to: establish at least one of: that the first speed of the first device 121 exceeds the first threshold, that the second speed of the first device 121 does not exceed the second threshold, that the third speed of the first device 121 does not exceed the third threshold, and that the first speed of the second device 122 does not exceed the third threshold. As described above, any of the results of the establishment actions may also be stored in the memory circuit 703.

In some embodiments, the processing circuit 701 is further configured to report to the D2D controller 160 at least one of: that the first speed of the first device 121 exceeds the first threshold, that the second speed of the first device 121 does not exceed the 25 second threshold, that the third speed of the first device 121 does not exceed the third threshold, and that the first speed of the second device 122 does not exceed the third threshold. As described above, any of these reports may also be stored in the memory circuit 703 and then, or directly, reported to the D2D controller 160 through the sending port 704.

In some embodiments, the processing circuit 701 is further configured to: establish at least one of: that the first estimation of future proximity of the first device 121 with respect to the second device 122 does not exceed a future proximity threshold and that the second estimation of future proximity of the first device 121 with respect to the second device 122 does not exceed the future proximity threshold.

As described above, the result of this establishment action may be stored in the memory circuit 703.

In some embodiments, the processing circuit 701 is further configured to report to the D2D controller 160 at least one of: that the first estimation of future proximity of the first device 121 with respect to the second device 122 does not exceed the future proximity threshold and that the second estimation of future proximity of the first device 121 with respect to the second device 122 does not exceed the future proximity threshold. As described above, any of these reports may also be stored in the memory circuit 703 and then, or directly, reported to the D2D controller 160 through the sending port 704. The sending port 704 may be configured to send to the D2D controller 160 any of the first, second and/or third speeds of the first device 121, the first speed of the second device 122, the first and second estimations of future proximity of the first device 121, and/or any of the reports that the first speed of the first device 121 exceeds the first threshold, that the second speed of the first device 121 does not exceed the second threshold and that the third speed of the first device 121 does not exceed the third threshold, and/or that the first or second estimations of future proximity of the first device 121 with respect to the second device 122 does not exceed the future proximity threshold, in the embodiments in which these factors are carried out by the first device 121.

In some embodiments, the processing circuit 701 is further configured to send a fourth configuration message to the second device 122 to use the second communication mode. The fourth configuration message may be first stored in memory circuit 703, or may be directly sent to the second device 122 through the sending port 704.

In some embodiments, the D2D controller 160 is co-located with a network node, and wherein the network node is one of: a base station, a stationary relay node, a mobile relay node, the first device 121, the second device 122, and a wireless device other than the first device 121 and the second device 122.

In some embodiments, at least one of the first speed of the first device 121, the second speed of the first device 121, the third speed of the first device 121 and the first speed of the second device 122 is obtained by any one of: absolute velocity, Doppler shift, signal variations over time for pilot signals, handover events, and a positioning method.

The D2D controller 160 may be a stationary D2D controller and wherein at least one of the first speed of the first device 121, the third speed of the first device 121 and the first speed of the first device 122 is an absolute device velocity.

In some embodiments, at least one of the first, second, third and the fourth configuration messages is one of: a recommendation for a configuration command, and a configuration command.

The memory circuit 703 may comprise one or more memory units. The memory circuit 703 is arranged to be used to store data such as, the first and third configuration messages, and the first, second and/or third speeds of the first device 121, the first speed of the second device 122, the first and/or second estimations of future proximity of the first device 121, and/or any of the reports that the first speed of the first device 121 exceeds the first threshold, that the second speed of the first device 121 does not exceed the second threshold, that the third speed of the first device 121 does not exceed the third threshold, that the first speed of the second device 122 does not exceed the third threshold, and/or that the first or second estimation of future proximity of the first device 121 with respect to the second device 122 does not exceed the future proximity threshold, and applications to perform the methods herein when being executed in the first device 121. Any of the other information processed by the processing unit 701, such as the first, second, third and future proximity thresholds, or the results of the establishment actions may also be stored in the memory circuit 703.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a Device-to-Device (D2D) controller for sending a configuration message to use a communication mode to a first device, wherein the first device is configured to enable communication with a second device through a network-controlled D2D communication mode, wherein the D2D controller, the first device and the second device are comprised in a wireless network, and wherein the method comprises:
    obtaining a first speed of the first device with respect to the D2D controller;
    when the first speed of the first device exceeds a first threshold, sending a first configuration message to the first device to use a first communication mode, wherein the first communication mode is one of the following communication modes:
    a cellular communication mode, and
    a device-controlled D2D mode;
    obtaining a second speed of the first device with respect to the D2D controller; and,
    when the second speed does not exceed a second threshold, sending a second configuration message to the first device to use a second communication mode, wherein the second communication mode is a network-controlled D2D communication mode.

2. The method of claim 1, further comprising sending a third configuration message to the second device to use the first communication mode.

3. The method of claim 1, further comprising establishing that the first speed of the first device exceeds the first threshold.

4. The method of claim 1, further comprising obtaining a third speed of the first device with respect to the second device, and wherein a configuration in the first configuration message is based on the third speed of the first device.

5. The method of claim 1, further comprising obtaining a first estimation of future proximity of the first device with respect to the second device, and wherein the configuration in the first configuration message is further based on the first estimation of future proximity of the first device with respect to the second device.

6. The method of claim 4, further comprising at least one of establishing that the third speed of the first device does not exceed a third threshold and establishing that a first estimation of future proximity of the first device with respect to the second device does not exceed a future proximity threshold, and wherein the first communication mode in the first configuration message sent to the first device is a device-controlled D2D mode.

7. The method of claim 6, further comprising:
obtaining a first speed of the second device with respect to the D2D controller;
obtaining a second estimation of future proximity of the first device with respect to the second device; and
when the first speed of the second device does not exceed the second threshold, sending a fourth configuration message to the second device to use the second communication mode.

8. The method of claim 7, wherein each of the obtaining the first speed of the first device, the obtaining the second speed of the first device, the obtaining the third speed of the first device, the obtaining the first estimation of future proximity of the first device, the obtaining the first speed of the second device, and the obtaining a second estimation of future proximity of the first device with respect to the second device, comprises, respectively, one of:
receiving the first speed of the first device, the second speed of the first device, the third speed of the first device, the first estimation of future proximity of the first device, the first speed of the second device, and the second estimation of future proximity of the first device from one of: a base station, the first device, the second device, a wireless device other than the first device and the second device, and a network node; and
measuring the first speed of the first device, the second speed of the first device, the third speed of the first device, the first estimation of future proximity of the first device, the first speed of the second device, and the second estimation of future proximity of the first device.

9. The method of claim 7, further comprising:
establishing that the second speed of the first device does not exceed the second threshold;
establishing that the first speed of the second device does not exceed the second threshold; and
establishing that the second estimation of future proximity of the first device with respect to the second device does not exceed the future proximity threshold.

10. The method of claim 1, wherein the D2D controller is co-located with a network node, and wherein the network node is one of: a base station, a stationary relay node, a mobile relay node, the first device, the second device, and a wireless device other than the first device and the second device.

11. The method of claim 7, wherein at least one of the first speed of the first device, the second speed of the first device, the third speed of the first device and the first speed of the second device is obtained by any one of: absolute velocity, Doppler shift, signal variations over time for pilot signals, handover events, and a positioning method.

12. The method of claim 7, wherein at least one of the first, second, third and fourth configuration messages is one of: a recommendation for a configuration command, and a configuration command.

13. A method in a first device for configuring the first device to use a communication mode, wherein the first device is configured to enable communication with a second device through a network-controlled D2D communication mode, wherein the first device, the second device and a D2D controller are comprised in a wireless network, and wherein the method comprises:
when a first speed of the first device with respect to the D2D controller exceeds a first threshold, receiving a first configuration message from the D2D controller, to configure the first device to use a first communication mode, wherein the first communication mode is one of the following communication modes:
a cellular communication mode, and
a device-controlled D2D mode;
configuring the first device to use the first communication mode based on the received first message;
when a second speed of the first device with respect to the D2D controller does not exceed a second threshold, receiving a second configuration message from the D2D controller to use a second communication mode, wherein the second communication mode is a network-controlled D2D communication mode; and
configuring the first device to use the second communication mode based on the received second message.

14. The method of claim 13, further comprising sending a third configuration message to the second device to use the first communication mode.

15. The method of claim 14, wherein the method further comprises sending a fourth configuration message to the second device to use the second communication mode.

16. The method of claim 13, further comprising:
measuring at least one of: the first speed of the first device with respect to the D2D controller, a third speed of the first device with respect to the second device, the second speed of the first device with respect to the D2D controller, and a first speed of the second device with respect to the D2D controller; and
sending to the D2D controller at least one of: the first speed of the first device, the second speed of the first device, the third speed of the first device, and the first speed of the second device.

17. The method of claim 13, further comprising:
measuring at least one of: a first estimation of future proximity of the first device with respect to the second device, and a second estimation of future proximity of the first device with respect to the second device; and
sending to the D2D controller at least one of: the first estimation of future proximity of the first device with respect to the second device, and the second estimation of future proximity of the first device with respect to the second device.

18. The method of claim 16, further comprising:
establishing at least one of: that the first speed of the first device exceeds the first threshold, that the second speed of the first device does not exceed the second threshold, that the third speed of the first device does not exceed a third threshold, and that the first speed of the second device does not exceed the second threshold; and
reporting to the D2D controller at least one of: that the first speed of the first device exceeds the first threshold, that the second speed of the first device does not exceed the second threshold, that the third speed of the first device does not exceed the third threshold, and that the first speed of the second device does not exceed the second threshold.

19. The method of claim 17, further comprising:
establishing at least one of: that the first estimation of future proximity of the first device with respect to the second device does not exceed a future proximity threshold and that the second estimation of future proximity of the first device with respect to the second device does not exceed the future proximity threshold; and
reporting to the D2D controller at least one of: that the first estimation of future proximity of the first device with respect to the second device does not exceed the future proximity threshold and that the second estimation of future proximity of the first device with respect to the second device does not exceed the future proximity threshold.

20. The method of claim 13, wherein the D2D controller is co-located with a network node, and wherein the network node is one of: a base station, a stationary relay node, a mobile relay node, the first device, the second device, and a wireless device other than the first device and the second device.

21. The method of claim 16, wherein at least one of the first speed of the first device, the second speed of the first device, the third speed of the first device and the first speed of the second device is obtained by any one of: absolute velocity, Doppler shift, signal variations over time for pilot signals, handover events, and a positioning method.

22. The method of claim 15, wherein at least one of the first, second, third and fourth configuration messages is one of: a recommendation for a configuration command, and a configuration command.

23. A D2D controller for sending a configuration message to use a communication mode to a first device, wherein the first device is configured to enable communication with a second device through a network-controlled D2D communication mode, wherein the D2D controller, the first device and the second device are arranged to be comprised in a wireless network, the D2D controller comprising:
a processing circuit configured to:
obtain a first speed of the first device with respect to the D2D controller;
send a first configuration message to the first device to use a first communication mode when the first speed of the first device exceeds a first threshold, wherein the first communication mode is one of the following communication modes:
a cellular communication mode, and
a device-controlled D2D mode;
obtain a second speed of the first device with respect to the D2D controller; and
send a second configuration message to the first device to use a second communication mode when the second speed does not exceed a second threshold;
wherein the second communication mode is a network-controlled D2D communication mode.

24. The D2D controller of claim 23, wherein the processing circuit is further configured to send a third configuration message to the second device to use the first communication mode.

25. The D2D controller of claim 23, wherein the processing circuit is further configured to establish that the first speed of the first device exceeds the first threshold.

26. The D2D controller of claim 23, wherein the processing circuit is further configured to obtain a third speed of the first device with respect to the second device.

27. The D2D controller of claim 23, wherein the processing circuit is further configured to obtain a first estimation of future proximity of the first device with respect to the second device.

28. The D2D controller of claim 27, wherein the processing circuit is further configured to establish at least one of: that a third speed of the first device does not exceed a third threshold and that the first estimation of future proximity of the first device with respect to the second device does not exceed a future proximity threshold.

29. The D2D controller of claim 28, wherein the processing circuit is further configured to:
obtain a first speed of the second device with respect to the D2D controller;
obtain a second estimation of future proximity of the first device with respect to the second device; and,
when the first speed of the second device does not exceed the second threshold, send a fourth configuration message to the second device to use the second communication mode.

30. The D2D controller of claim 29, wherein the processing circuit is further configured to, one of:
receive at least one of: the first speed of the first device, the second speed of the first device, the third speed of the first device, the first estimation of future proximity of the first device, the first speed of the second device, and the second estimation of future proximity of the first device from one of: a base station, the first device, the second device, a wireless device other than the first device and the second device, and a network node, and
measure at least one of: the first speed of the first device, the second speed of the first device, the third speed of the first device, the first estimation of future proximity of the first device, the first speed of the second device, and the second estimation of future proximity of the first device.

31. The D2D controller of claim 23, wherein the D2D controller is co-located with a network node, and wherein the network node is one of: a base station, a stationary relay node, a mobile relay node, the first device, the second device, and a wireless device other than the first device and the second device.

32. The D2D controller of claim 29, wherein at least one of the first speed of the first device, the second speed of the first device, the third speed of the first device and the first speed of the second device is obtained by any one of: absolute velocity, Doppler shift, signal variations over time for pilot signals, handover events, and a positioning method.

33. The D2D controller of claim 29, wherein at least one of the first, second, third and fourth configuration messages is one of: a recommendation for a configuration command, and a configuration command.

34. A first device for configuring the first device to use a communication mode, wherein the first device is configured to enable communication with a second device through a network-controlled D2D communication mode, wherein the first device, the second device and a D2D controller are arranged to be comprised in a wireless network, and wherein the first device comprises:
a processing circuit configured to:
receive a first configuration message from the D2D controller, to configure the first device to use a first communication mode when a first speed of the first device with respect to the D2D controller exceeds a first threshold, wherein the first communication mode is one of the following communication modes:
a cellular communication mode, and
a device-controlled D2D mode;
configure the first device to use the first communication mode based on the received first message;
receive a second configuration message from the D2D controller to use a second communication mode when a second speed of the first device with respect to the D2D controller does not exceed a second threshold, wherein the second communication mode is a network-controlled D2D communication mode; and
configure the first device to use the second communication mode based on the received second message.

35. The first device of claim 34, wherein the processing circuit is further configured to send a third configuration message to the second device to use the first communication mode.

36. The first device of claim 35, wherein the processing circuit is further configured to send a fourth configuration message to the second device to use the second communication mode.

37. The first device of claim 34, wherein the processing circuit is further configured to:
measure at least one of: the first speed of the first device with respect to the D2D controller, a third speed of the first device with respect to the second device, the second speed of the first device with respect to the D2D controller, and a first speed of the second device with respect to the D2D controller; and
send to the D2D controller at least one of: the first speed of the first device, the second speed of the first device, the third speed of the first device, and the first speed of the second device.

38. The first device of claim 34, wherein the processing circuit is further configured to:
measure at least one of: a first estimation of future proximity of the first device with respect to the second device, and a second estimation of future proximity of the first device with respect to the second device; and
send to the D2D controller at least one of: the first estimation of future proximity of the first device with respect to the second device, and the second estimation of future proximity of the first device with respect to the second device.

39. The first device of claim 37, wherein the processing circuit is further configured to:
establish at least one of: that the first speed of the first device exceeds the first threshold, that the second speed of the first device does not exceed the second threshold, that the third speed of the first device does not exceed a third threshold, and that the first speed of the second device does not exceed the second threshold; and
report to the D2D controller at least one of: that the first speed of the first device exceeds the first threshold, that the second speed of the first device does not exceed the second threshold, that the third speed of the first device does not exceed the third threshold, and that the first speed of the second device does not exceed the second threshold.

40. The method of claim 38, wherein the processing circuit is further configured to:
establish at least one of: that the first estimation of future proximity of the first device with respect to the second device does not exceed a future proximity threshold and that the second estimation of future proximity of the first device with respect to the second device does not exceed the future proximity threshold; and
report to the D2D controller at least one of: that the first estimation of future proximity of the first device with respect to the second device does not exceed the future proximity threshold and that the second estimation of future proximity of the first device with respect to the second device does not exceed the future proximity threshold.

41. The first device of claim 34, wherein the D2D controller is co-located with a network node, and wherein the network node is one of: a base station, a stationary relay node, a mobile relay node, the first device, the second device, and a wireless device other than the first device and the second device.

42. The first device of claim 37, wherein at least one of the first speed of the first device, the second speed of the first device, the third speed of the first device and the first speed of the second device is obtained by any one of: absolute velocity, Doppler shift, signal variations over time for pilot signals, handover events, and a positioning method.

43. The first device of claim 36, wherein at least one of the first, second, third and fourth configuration messages is one of: a recommendation for a configuration command, and a configuration command.

* * * * *